US011607847B2

(12) United States Patent
Lambrecht et al.

(10) Patent No.: US 11,607,847 B2
(45) Date of Patent: Mar. 21, 2023

(54) STEREOLITHOGRAPHY APPARATUS WITH A CONTAINER ASSEMBLY

(71) Applicant: BEGO BREMER GOLDSCHLÄGEREI WILH HERBST GMBH & CO. KG, Bremen (DE)

(72) Inventors: Heinz Lambrecht, Bremen (DE); Sergej Tregubow, Rastede (DE)

(73) Assignee: BEGO BREMER GOLDSCHLÄGEREI WILH. HERBST GMBH & CO. KG, Bremen (DE)

(*) Notice: Subject to any disclaimer, the term of this patent is extended or adjusted under 35 U.S.C. 154(b) by 503 days.

(21) Appl. No.: 15/500,901

(22) PCT Filed: Jul. 31, 2015

(86) PCT No.: PCT/EP2015/067710
§ 371 (c)(1),
(2) Date: Jan. 31, 2017

(87) PCT Pub. No.: WO2016/016443
PCT Pub. Date: Feb. 4, 2016

(65) Prior Publication Data
US 2017/0246797 A1 Aug. 31, 2017

(30) Foreign Application Priority Data

Aug. 1, 2014 (DE) .......................... 102014215213.5
Aug. 1, 2014 (DE) .......................... 102014215218.6

(51) Int. Cl.
B29C 64/00 (2017.01)
B29C 64/255 (2017.01)
(Continued)

(52) U.S. Cl.
CPC ............ *B29C 64/255* (2017.08); *B29C 31/02* (2013.01); *B29C 64/00* (2017.08); *B29C 64/10* (2017.08);
(Continued)

(58) Field of Classification Search
CPC .............................. B29C 64/386; B29C 64/20
See application file for complete search history.

(56) References Cited

U.S. PATENT DOCUMENTS 5,143,663 A * 9/1992 Leyden ................. B29C 64/135
264/401
5,545,367 A * 8/1996 Bae ......................... B33Y 50/02
264/401

(Continued)

FOREIGN PATENT DOCUMENTS

CN 101489765 7/2009
CN 202804004 3/2013
(Continued)

OTHER PUBLICATIONS

Zhou, C. and Chen, Y., 2012. Additive manufacturing based on optimized mask video projection for improved accuracy and resolution. Journal of Manufacturing Processes, 14(2), pp. 107-118. (Year: 2011).*

(Continued)

Primary Examiner — Nicholas R Krasnow
(74) Attorney, Agent, or Firm — Kilpatrick Townsend & Stockton LLP

(57) ABSTRACT

The invention relates to a stereolithography apparatus comprising: a container for a fluid material curable by radiation, a substrate plate, an actuator means for generating a relative movement between the container and the substrate plate, and an irradiation device for selectively irradiating the material arranged in the container. According to the invention, the (Continued)

actuator means and the irradiation device are mounted on a frame assembly, and the container and the substrate plate are combined to form an assembly and the assembly consisting of the container and the substrate plate is jointly inserted into the frame assembly, detachably secured therein by means of an attachment means and to be jointly removed from the frame assembly.

16 Claims, 7 Drawing Sheets

(51) Int. Cl.

| | | |
|---|---|---|
| *B33Y 10/00* | (2015.01) | |
| *B33Y 30/00* | (2015.01) | |
| *B29C 31/02* | (2006.01) | |
| *B29C 64/129* | (2017.01) | |
| *B29C 64/386* | (2017.01) | |
| *B29C 64/227* | (2017.01) | |
| *B29C 64/268* | (2017.01) | |
| *B29C 64/307* | (2017.01) | |
| *B29C 64/25* | (2017.01) | |
| *B33Y 80/00* | (2015.01) | |
| *B29C 64/245* | (2017.01) | |
| *B33Y 50/00* | (2015.01) | |
| *B29C 64/20* | (2017.01) | |
| *B33Y 70/00* | (2020.01) | |
| *B29C 64/182* | (2017.01) | |
| *B29C 64/205* | (2017.01) | |
| *B33Y 40/20* | (2020.01) | |
| *B33Y 40/10* | (2020.01) | |
| *B33Y 99/00* | (2015.01) | |
| *B29C 64/176* | (2017.01) | |
| *B29C 64/40* | (2017.01) | |
| *B29C 64/30* | (2017.01) | |
| *B33Y 40/00* | (2020.01) | |
| *B29C 64/10* | (2017.01) | |
| *B33Y 50/02* | (2015.01) | |
| *B29K 105/00* | (2006.01) | |

(52) U.S. Cl.
CPC .......... *B29C 64/129* (2017.08); *B29C 64/176* (2017.08); *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/268* (2017.08); *B29C 64/30* (2017.08); *B29C 64/307* (2017.08); *B29C 64/386* (2017.08); *B29C 64/40* (2017.08); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *B29K 2105/0058* (2013.01)

(56) References Cited

U.S. PATENT DOCUMENTS

| | | | |
|---|---|---|---|
| 2006/0078638 A1* | 4/2006 | Holmboe | B33Y 30/00 425/174.4 |
| 2007/0074659 A1* | 4/2007 | Wahlstrom | B29C 64/153 118/679 |
| 2007/0075459 A1* | 4/2007 | Reynolds | B33Y 30/00 264/401 |
| 2007/0077323 A1* | 4/2007 | Stonesmith | B29C 64/135 425/174.4 |
| 2008/0217818 A1* | 9/2008 | Holmboe | B33Y 30/00 264/401 |
| 2013/0052292 A1* | 2/2013 | Busato | B29C 64/232 425/174.4 |
| 2015/0056320 A1* | 2/2015 | Costabeber | B33Y 30/00 425/169 |
| 2016/0200044 A1* | 7/2016 | Voit | B29C 64/20 264/401 |
| 2016/0288421 A1* | 10/2016 | Costabeber | B29C 64/259 |
| 2017/0361528 A1* | 12/2017 | Busato | B33Y 30/00 |

FOREIGN PATENT DOCUMENTS

| | | |
|---|---|---|
| CN | 103522546 | 1/2014 |
| DE | 9415849 | 1/1995 |
| EP | 1253002 | 10/2002 |
| WO | 2014016668 | 1/2014 |
| WO | 2016016443 | 2/2016 |

OTHER PUBLICATIONS

International Application No. PCT/EP2015/067710, International Preliminary Report on Patentability dated Feb. 16, 2017, 12 pages (9 pages for the original document and 3 pages for the English translation).

International Application No. PCT/EP2015/067710, International Search Report and Written Opinion dated Dec. 15, 2015, 30 pages (16 pages for the original document and 14 pages for the English translation).

Chinese Patent Application No. 201580049578.9, Office Action dated Jul. 8, 2019, 9 pages.

* cited by examiner

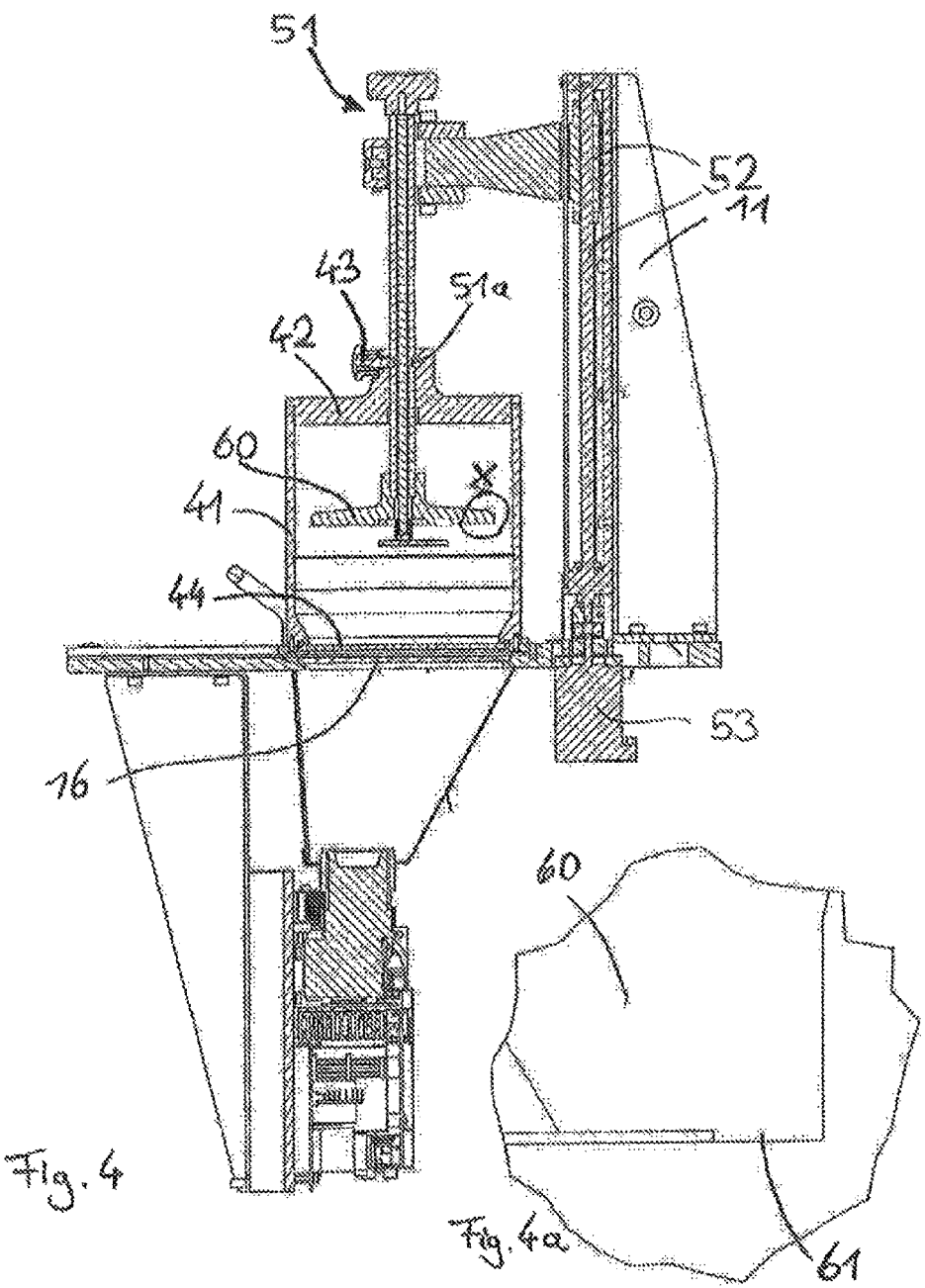

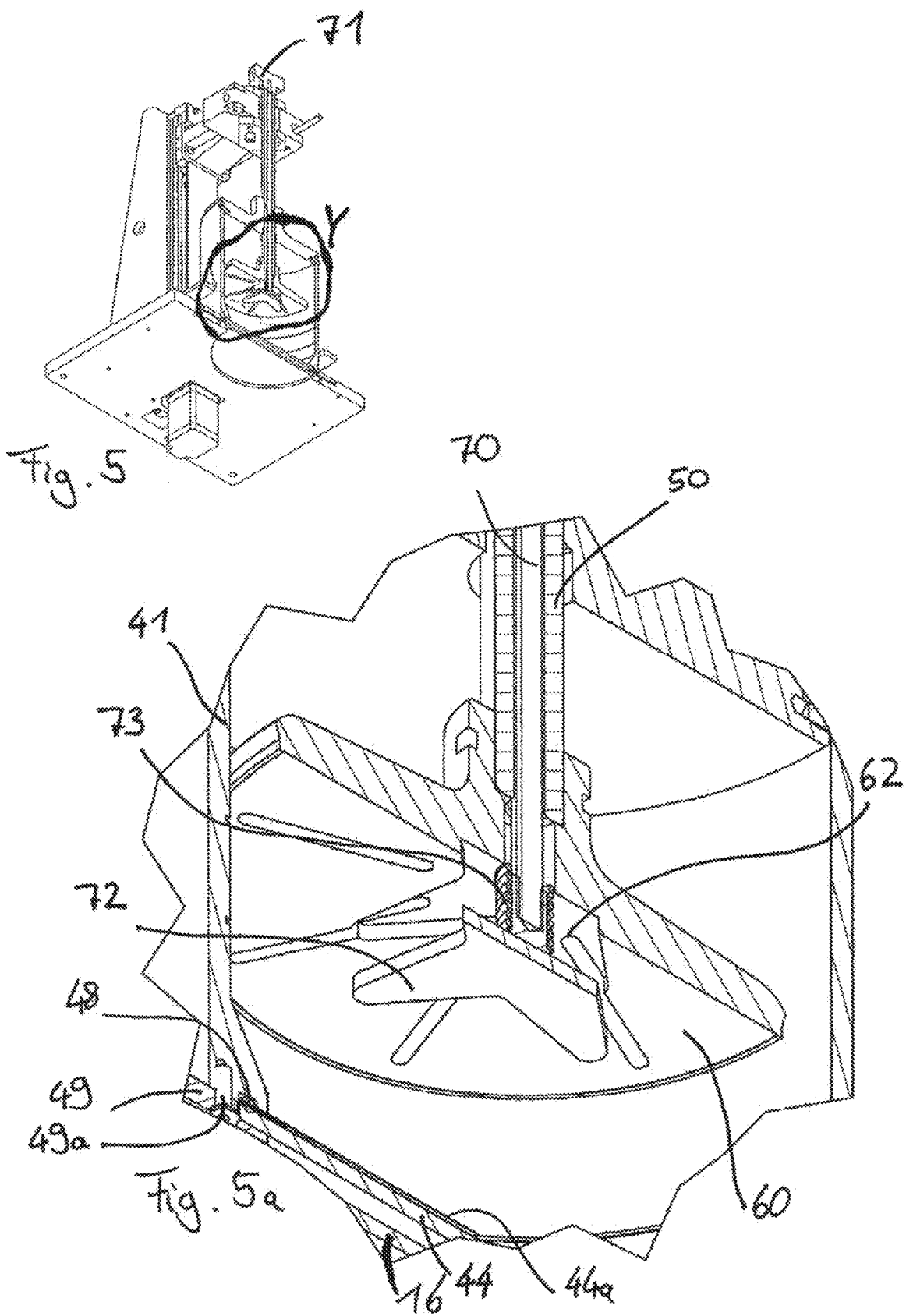

STEREOLITHOGRAPHY APPARATUS WITH A CONTAINER ASSEMBLY

The invention relates to a stereolithography apparatus comprising: a container for a fluid material curable by radiation, a substrate plate, an actuator means for generating a relative movement between the container and the substrate plate, and an irradiation device for selectively irradiating the material arranged in the container.

Another aspect of the invention relates to a method of producing three-dimensional shaped bodies by means of stereolithography, comprising the steps of: securing a container, with a fluid material curable by irradiation disposed therein to a frame assembly, producing the three-dimensional shaped body layer by layer by multiple repetition of a series of steps comprising the steps of: moving a substrate plate detachably mounted on the frame assembly by a predetermined layer thickness relative to the container by means of an actuator means mounted on the frame assembly, filling a cavity ensuing from the relative movement with the fluid material, and selectively curing the material disposed in the cavity by selectively irradiating the material in regions to be cured by means of an irradiation device mounted on the frame assembly.

Stereolithography apparatuses and methods of this kind are used to produce three-dimensional objects. The starting material basically used in stereolithography is a fluid medium that can be cured, that is to say changed to a solid state, by the action of radiation. Photo-cured plastics, for example acrylate or epoxy resin systems, are typically used in stereolithography but all other kinds of radiation-curable materials are also used. The material is cured with a form of radiation that can be applied as visible light, UV light or any other form of electromagnetic radiation with a suitable wavelength for curing the material.

Stereolithography is based on the principle that a three-dimensional shaped body is built up layer by layer by producing successive layers of the curable material. The layers are cured in such a way that a respective cross-section through the shaped body is exposed to radiation and thus selectively cured. Simultaneously with curing, the selectively cured portions of each layer are joined to a layer produced in the preceding step. This principle is realized functionally in such a way that the shaped body is built up on a substrate plate which is successively lowered by one layer thickness into a bath of the curable fluid material, and after each lowering of the substrate plate by one layer is cured selectively, that is to say in predetermined sub-regions, by respective selective irradiation of the fluid material that has moved into the space formed by layer-by-layer lowering of the substrate plate.

FIG. 3 in U.S. Pat. No. 4,575,330 shows such a stereolithography apparatus, which operates according to the principle of successively lowering a substrate plate into a bath of fluid and which selectively cures layers of fluid that respectively form at the surface of the fluid bath, in order to produce the shaped body layer by layer. FIG. 4 of the same document shows a converse principle, in which a substrate plate is successively raised in a fluid bath and the shaped body is built up on the underside of the substrate plate, in that the new layers of fluid forming by successive raising of the substrate layer by layer are irradiated through a bottom area of the vat receiving the fluid, said bottom area being permeable to radiation.

These two principles are basically suitable for producing individual prototypes by the stereolithography technique. However, they have various disadvantages that prevent the stereolithography process from being handled in a practicable manner and from being carried out quickly. In the case of the stereolithographic technique in which the platform is lowered and light is shone from above, for example, it is necessary to have a large volume of fluid in the vat, and removing the completed shaped body and allowing the uncured fluid material to drain from cavities is a complicated process and one that is difficult to handle. Although a smaller amount of fluid is needed, in principle, in the case of the stereolithographic technique in which the platform is raised and light is shone from below, the fluid level must always be maintained at such a level that fluid can flow reliably out of the bath despite the consumption and raising of the (cured) fluid material during the production process. For that reason, a larger amount of fluid is typically filled into the vat in this case also.

However, the basic problem with this method is that the cured fluid can stick to the bottom area of the fluid vat, which is permeable to radiation. Complex measures and devices for preventing such sticking by means of a film are known from EP 1 439 052 B1. What is problematic about using such a film, however, is that the anti-stick film tends likewise to stick to a slight degree to the cured regions of a layer produced thereon. This adhesion cannot be overcome by the small movement of the substrate plate to produce the next layer, so no gap filled with fluid ensues. Raising the substrate plate a longer distance in order to detach the most recently produced layer from the anti-stick film reliably and to then lower the substrate plate again in order to produce the next layer is therefore known from the prior art. That procedure is time-consuming, however.

One known way of shortening the production time is to detect the force necessary to raise the substrate plate and to determine on the basis of that force the detachment between the latest layer to be produced and the anti-stick film and to lower the substrate plate immediately after said detachment. However, this procedure requires a force sensor and complex control and has proved to be prone to error.

Another general problem that arises in stereolithography apparatuses and methods of known design concerns the calibration of the substrate plate that is necessary with regard to the positioning of the fluid vat, the substrate plate and the orientation of the irradiation. The radiation is typically provided as laser radiation or a focused beam path or a masked radiation image and requires, to produce the shaped body with low tolerances, precise, relative positioning of the substrate plate and the respective layer to be cured, on the one hand, and of the irradiation device, on the other. In the method involving irradiation from below, exact positioning in relation to the vat in which the fluid is received is additionally necessary. In order to produce a shaped body with precision, it is essential that, in relation to the surface on which the shaped body is built up, the substrate plate is oriented exactly parallel to the surface of the fluid (in the case of irradiation from above) or exactly parallel to the vat bottom (in the case of irradiation from below), in order to achieve a uniform thickness in the first layer, and to avoid consequential errors for subsequent layers. This positioning or referencing or calibration of the mechanically moved components is time-consuming and is prone to error, and for reason it slows down the stereolithography production process, or increases the risk of producing shaped bodies that are not sufficiently exact in size. Coupling the substrate plate in a defined position to an actuator, thus achieving parallelism of the substrate plate relative to the vat bottom (x- and y-axis) and allowing a vertical starting position (z-axis) to be moved to with precision, is known from the prior art. This process of coupling and positioning is time-consuming, however, and therefore causes a delay in the production process.

Another problem is that, for the purpose of referencing the essential components, there must be some way for the user of a stereolithography apparatus to monitor it in order to carry out and monitor the process of referencing, startup and running of the method. Using transparent vats to receive the fluid, and to dimension them so large and open that it is possible for the user to perform such visual inspection, and that it is also possible for the user to perform manipulations on the substrate plate by hand, is known from the prior art. However, the disadvantage is that the fluid bath can become contaminated due to this necessity, and that the quality of the fluid may deteriorate due the effects of lighting, with curing in undesired regions possibly occurring in some cases as well. Another disadvantage of prior art stereolithography methods, finally, is that segregation of the fluid bath may occur due to calibration taking a long time in many cases, and that, particularly whenever several production processes are performed one after the other from a fluid bath, such segregation may be accompanied by a deterioration in the properties of the curable fluid.

The object of the invention is to provide a stereolithography apparatus which allows faster production, without increasing the risk of contamination and undesired light effects as a result.

This object is achieved, according to the invention, with a stereolithography apparatus of the kind initially specified, in which the actuator means and the irradiation device are mounted on a frame assembly, and the container and the substrate plate are combined to form an assembly, and the assembly consisting of the container and the substrate plate is jointly inserted into the frame assembly, detachably secured therein by means of an attachment means and to be jointly removed from the frame assembly.

The stereolithography apparatus according to the invention is developed such that the fluid vat is in the form of a container and is formed in an assembly with the substrate plate. Therefore, there is no need for the container and the substrate plate, as in the prior art, to be inserted as a separate vat into the frame assembly and locked into place therein, and to be inserted as a substrate plate into the frame assembly and locked into place therein. Instead, the assembly comprising the substrate plate and the container are jointly inserted as a pre-assembled construction and therefore in one step into the frame assembly. Due to this design as an assembly, the substrate plate is already arranged in a defined position in relation to the container. This gives rise to the advantage that referencing, or moving to a starting point for the substrate plate relative to the container, can either be left out entirely, because there is already a unique position for the substrate plate inside the container in relation to all three spatial directions, or that referencing is significantly simplified, because the positioning of the substrate plate in relation to the container is already defined in relation to one or two spatial directions.

What is also advantageous about the embodiment according to the invention is that there is substantially less contamination of the fluid in the container and that there is less vaporization of low-viscosity components from the fluid due to the fact that the manual handling that has to be carried out with the fluid being less intensive on the whole.

Because of that, the fluid can be used for a substantially longer period of time and for that reason does not have to be replaced so often. This makes it possible to keep a larger volume of fluid in the container, i.e., to provide a higher filling level in the container. The greater hydrostatic pressure that ensues as a result at the bottom of the fluid body has two immediate advantages for the production process: (i) It ensures that further fluid flows better into the gap that forms after a finished layer is raised from the bottom of the container (ii) When an anti-stick film is used, it ensures that the film is pressed better against the bottom plate of the container.

The container that is used in accordance with the invention may preferably have a cylindrical shape with cylinder axes standing perpendicularly, and polygonal shapes are also advantageous as alternatives in certain applications. The volume inside the container is preferably above a lower limit of 0.25 liters, 0.5 liters or 1 liter and/or it preferably does not exceed an upper limit of 0.5 liters, 1 liter or 2 liters. The diameter of the container is preferably more than 2.5 cm, 5 cm or more than 10 cm and/or is not greater than 5 cm, 10 cm or 20 cm.

The irradiation device is preferably adapted to provide an exposure time of 2 s-30 s and an exposure energy of 0.5 to 1 W/mm$^2$, in particular 0.7+/−0.1 W/mm$^2$. The irradiation device is preferably adapted to emit radiation with a wavelength of 300 nm to 900 nm, in particular 315-490 nm and/or preferably has a resolution in the irradiated plane of at least 600×800 pixels, preferably 1920×1080 pixels. The irradiated plane is preferably no smaller than 25 cm$^2$, in particular no smaller than 50 cm$^2$.

The actuator means is preferably adapted such that a minimum feed distance—and thus a minimum layer thickness for a single layer of the shaped body—of no more than 0.001 mm, 0.01 mm or 0.1 mm can be carried out.

An assembly is to be understood here as a combination of components that are directly connected to each other mechanically and which are thus arranged in a defined position or orientation relative to one another. An assembly can therefore for handled as a single unit by a user, without the components included in the assembly having to be held in position by the user. The container and the substrate plate may be detachable and/or connected to each other via an appropriate guide mechanism, so that it is also possible to separate the container and the substrate plate.

Embodying the container and the substrate plate as an assembly also obviates any need to insert the substrate plate, within the stereolithography apparatus, into the fluid vat or the container, to align it and to move it to a reference point. It is no longer necessary, therefore, for the user to operate and manipulate the substrate plate or the container manually within the stereolithography apparatus, and this allows the the container and the substrate plate to have compact dimensions and their dimensions to be co-ordinated in such a way that only a small size of container is necessary. The volume of fluid material inside the container can be reduced as a consequence, and the risk of contamination is reduced by the smaller container.

Embodying the container and the substrate plate as an assembly also means there is no longer any need for a user to be able to visually sense the substrate plate inside the container and to be able to monitor its positioning and orientation. The container in the stereolithography apparatus according to the invention does not have to be translucent, therefore, in order to allow such visual observation, but may be partly impervious to light to prevent radiation from entering the interior of the container inadvertently.

The substrate plate preferably has a flat bottom surface with a downwardly projecting distance spacer formed thereon. This allows the substrate plate to be lowered, for example purely by the action of gravity, before the first layer is formed, and to allow it to come to rest on the bottom plate of the container and to keep a distance that is sufficient for production of the first layer. The distance spacer may specifically take the form of an outer circumferential protrusion, for example as a collar. This prevents any damage being caused to the bottom plate, or to an anti-stick film disposed there in a middle region important for the production process, when a relative movement occurs between the substrate plate and the bottom plate of the container. The height of the distance spacer may be one layer thickness, or some smaller height.

According to a first preferred embodiment, it is preferred that the container has a side wall that is impermeable to radiation from the irradiation device. The container may basically be designed in such a way that it has a rectangular cross-section, that is to say, it is cuboidal overall and thus has four side walls. In that case, one of the side walls, or more than one of the side walls or all of the side walls may be impermeable to radiation. Container shapes with a round cross-section, that is to say, with a cylindrical side wall, are also options. In that case, the entire cylindrical side wall may be impermeable to radiation or sections of the cylindrical side wall may be designed to be impermeable to radiation.

Impermeability to radiation should be understood here to mean that the side wall is impermeable to the radiation from the irradiation device, at least, i.e., that it reflects or absorbs that radiation. That does not preclude the side wall also being impermeable to radiation of other wavelengths. It is preferred, in particular, that the side wall is impermeable to radiation in all wavelength ranges that result in partial or complete curing of the fluid material. When the side wall is designed in this way, the fluid material can be stored in the container for a long period of time without any deterioration in its quality. Unwanted curing of the material by stray light or other radiation sources can be prevented or significantly reduced in this way.

According to another preferred embodiment, the container has a bottom plate which is permeable to the radiation from the irradiation device, and the irradiation device is adapted to introduce the radiation into the container from below. Providing a bottom plate which is permeable to the radiation from the irradiation device makes it possible to build up the three-dimensional shaped body inside the container layer by layer by exposure to radiation from below. This configuration, with irradiation from below and successive raising of the substrate plate inside the container, is especially advantageous for the inventive design of the stereolithography apparatus, because when the container functions in this manner, it does not have to allow any radiation to enter it from above and can consequently be of particularly compact and closed design.

It is further preferred in this regard when an anti-stick coating is applied to the side of the bottom plate facing the interior of the container. This design of the bottom plate reliably prevents the cured material from sticking to the bottom plate. A anti-stick coating should be understood in this context to be a layer of material that is applied directly to the bottom plate, that is to say, that adheres to the bottom plate by the action of forces that cause adhesion directly. In contrast to films that are meant to prevent adhesion, such an anti-stick coating is advantageous in that it allows a gap to form, in a reliable manner, between the shaped body and the bottom plate, into which gap the fluid material flows when the substrate plate is raised by one layer thickness. Materials that are specifically suitable for such an anti-stick coating include fluoroplastics, for example perfluoroalkoxy polymers (PFAs) or fluoroethylenepropylene polymers (FEP), which have very low adhesion and thus provide reliable separation of the cured layer from the bottom plate.

As an alternative to that embodiment, an anti-stick film, for example an FEP or PFA film, may be disposed, according to the invention, on the side of the bottom plate facing the interior of the container, and this anti-stick film may be spanned fluid-tightly on all sides across the bottom plate and fluid-tightly enclose a predefined volume greater than zero between the anti-stick film and the bottom plate. Just like an anti-stick coating, such an anti-stick film can reliably prevent the lowermost layer of the shaped body from sticking to the bottom plate. The anti-stick film also has the advantage that it can be easily replaced when the anti-stick effect diminishes, without having to replace the bottom plate, as would generally be the case with an anti-stick coating.

Such an anti-stick film is known from EP 1 439 052 B1. In contrast to the technology known from this prior art, the anti-stick film provided in accordance with the invention is spanned fluid-tightly against the bottom plate on all sides and thus encloses fluid-tightly a predefined volume between the bottom plate and the anti-stick film. This allows the shape of the enclosed volume to be changed, and hence a change in the contour of the anti-stick film in relation to the geometry of the bottom plate. This possibility of changing the contour allows a peeling effect to occur, whatever the geometry of the lowermost layer of the shaped body, when the shaped body is pulled off the anti-stick film, so little force is needed to remove the shaped body from the anti-stick film. In the process of such removal, no fluid, in other words neither a gas nor a liquid, is fed into the cavity between the anti-stick film and the bottom plate, so there is no need for controlled discharge of such a fluid in order to keep constant the refractional or reflective properties of the system consisting of the anti-stick film, the bottom plate and the volume of material therebetween.

It is still further preferred that the bottom plate is detachably and sealingly connected to the side wall of the container. The bottom plate may be integral in design, that is to say, undetachable from and integral with the inside wall of the container, thus providing a reliable seal between the side wall and the bottom plate. However, it is advantageous if the bottom plate is joined detachably and sealingly to the side wall of the container to enable the bottom plate to be replaced, for example when its permeability to radiation is reduced due to repeated use, or when the properties of the anti-stick layer are no longer satisfactory. Various options for securing the bottom plate to the inside wall of the container are conceivable in this regard. It is preferred, in particular, that the bottom plate is secured by positive engagement to the side wall of the container to provide a defined position for the bottom plate in relation to the side wall of the container. Such a defined position is advantageous for subsequent referencing of the assembly consisting of the container and the substrate plate inside the stereolithography apparatus, because this reproducibly provides the bottom plate with an upper surface position.

The stereolithography apparatus can be developed by providing a cover which is detachably connected to the container and closes the container and which is preferably impermeable to the radiation from the irradiation device. By providing such a cover, the container is sealed at its top side also, thus prevent any particles, dirt or the like from entering the interior of the container from above. The cover of the container may be similarly impermeable to the radiation from the irradiation device, so as to maintain the quality of the fluid material inside the container over a long period of time. The cover is preferably joined detachably to the container, that is to say, detachably joined to one or more side walls of the container, so that the cover can be removed and the substrate plate can be removed from the interior of the container along with the shaped body that has been produced. The cover preferably closes the container fluid-tightly, i.e., it seals the cover against gases and liquids.

It is particularly preferred in this regard that the actuator means comprises a coupling rod which is connected to the substrate plate and which extends through the cover and which is preferably guided in the cover for axial movement in the longitudinal direction of the coupling rod. According to this embodiment, the assembly comprising the container and the substrate plate also includes a coupling rod which is connected to the substrate plate and which extends through the cover. This coupling rod is guided at the cover, in particular by a guiding recess in the cover, and is supported at said recess in relation to two spatial directions and is thus guided for movement in one spatial direction. By means of the coupling rod, the substrate plate can be easily coupled to the actuator and the movement of the actuator means can be easily transferred to the substrate plate, in order to perform to raise the substrate plate successively in the course of the production process. The coupling rod may also be guided in such a way, basically, that it cannot rotate in relation to the cover, for example by the coupling rod having a non-circular cross-sectional profile and being guided in a matching congruent, non-circular guide bushing in the cover. When the cover is accordingly fixed to the container in such a way that it cannot rotate, this allows the container, the substrate plate and the coupling rod to be positioned reproducibly in relation to the frame assembly, so that referencing is so precise and simplified that even removal and re-insertion of the container during a break in a production process does not necessarily lead to any relevant imprecision in production. This non-circular cross-sectional profile or anti-twist protection may preferably extend only across that section of the coupling rod that runs in the corresponding, anti-twist guide while the shaped body is being formed.

This coupling rod can preferably co-operate with a detachable locking mechanism adapted to lock the coupling rod, relative to the vertical (z-) axis, in a position in which the substrate plate is raised from the bottom plate, preferably as far as a region adjacent to the cover of the container, i.e., approximately in the upper quarter or fifth of the container, and to allow the coupling rod to rotate about the vertical axis. By means of such a locking mechanism and rotation of the coupling rod, it is possible, after completion of a shaped body, to position it above the fluid bath and to allow surplus fluid to drip off. By providing additional rotation about the z-axis, the coupling rod and thus the shaped body attached thereto via the substrate plate can still be rotated. This exerts a centrifuging effect on the surplus fluid material, which is slung off outwardly as a result, stopped by the side walls of the container and guided back into the fluid bath for further use. An appropriate handle may be provided at the top end of the coupling rod for the purpose of such rotation, or the coupling rod may be coupled to an actuator for rotating the coupling rod about its longitudinal axis. The locking mechanism according to the invention may take the form of a circumferential groove in the coupling rod, with a locking element that latches into it being provided on the frame assembly, and this locking element may, for example, be a ball which is spring-loaded in the radial direction.

The coupling means may consist, for example, in a screw connection or a clamping device which can be opened and closed by a quick-release fastener such as a toggle clamp. The coupling rod is fixed in the coupling means in such a way that it can transfer the relative movement from the actuator means to the substrate plate. It should be understood, as a basic principle, that other mechanical elements for force transmission may be deployed between the coupling means and the actuator means.

Another preferred embodiment of the stereolithography apparatus according to the invention has an electronic controller which is adapted to control layer-by-layer production of the shaped body, in that the actuator means and the irradiation apparatus are adapted to perform the sequence of steps: moving a substrate plate detachably mounted on the frame assembly by a predetermined layer thickness relative to the container by means of an actuator means mounted on the frame assembly, filling a cavity ensuing from the relative movement with the fluid material, and selectively curing the material disposed in the cavity by selectively irradiating the material in regions to be cured by means of an irradiation device mounted on the frame assembly, and which is also adapted to control, before starting that sequence of steps, a mixing process in which the actuator means is driven at least once, preferably several times, to perform a reciprocal relative movement over a distance of several layer thicknesses. According to this preferred embodiment, the production sequence is controlled by means of an electronic controller which is programmed to control the actuator means and the irradiation device accordingly. For that purpose, the controller is coupled in signal communication with the actuator means and the irradiation device and sends control signals to those devices. It controls the sequence of steps involving layer-by-layer movement of the substrate plate by means of the actuator means, and irradiation by the irradiation device of the fluid that respectively flows in to fill the cavity, with sequential curing of sections of that layer. The controller is also adapted to control a mixing process, in which the actuator means is driven and moves the substrate plate up and down once or more, with the substrate plate traveling a distance which is greater than one layer thickness and which preferably amounts to several layer thicknesses. Due to this movement of the substrate plate, the fluid in the container is thoroughly mixed, so that any segregation processes that might occur after extended storage are reversed as a result. The mixing motion is performed as a reciprocal relative movement, that is to say, the substrate plate moves back and forth at least once, preferably several times back and forth, in order to mix the fluid bath thoroughly by this movement back and forth.

The electronic controller may also be adapted, additionally or alternatively, to control the actuator means, after the last sequence of steps in the process of producing the shaped body has been carried out, in such a way that the substrate plate and the shaped body produced layer by layer is moved into a position above the fluid material in the container.

This is advantageous, in particular, for making the uncured fluid drip from and out of the shaped body. If necessary, the actuator means can also be controlled to travel such a large distance that the substrate plate and the shaped body, together with the cover of the container, are raised and guided out of the container, in order to pull out the shaped body upwards and to make the end of the production process visible to an operator of the system and to allow the shaped body to be removed.

According to another preferred embodiment, the stereolithography apparatus is developed by an illumination device which is arranged inside the container and which is adapted to illuminate the inner space of the container with visible light having a wavelength that is not suitable for curing the fluid material, or by a second container with an illumination device arranged inside said second container and adapted to illuminate the inner space of the container with radiation having a wavelength that is suitable for curing the fluid material, wherein the frame assembly has an attachment means for selectively securing the container or the second container in a defined position. Such an illumination device can serve to illuminate the inner space of the container with visible light, so that a user of the apparatus can check production progress and can check other properties inside the container that are relevant for production. It makes sense with this variant and for this purpose to provide the illumination device in a container and as an integral assembly with said container that also includes a substrate plate. Alternatively, such an illumination device can also be used for post-curing a completed shaped body. In such post-curing, the entire shaped body is irradiated with radiation having a wavelength that is suitable for curing the fluid material, but this irradiation is not carried out selectively, but as diffuse irradiation of the shaped body in its entirety. In such an embodiment, it makes sense to arrange the illumination device in a second container into which the completed shaped body can be inserted after the production process. This second container can be inserted and locked into the frame assembly either in place of the container in which production occurred, or it may already have been inserted into the frame assembly, and either the shaped body is then transferred by a respective movement and displacement of the actuator from the one container into the other, or the second container is moved to the position of the container in which production occurred, for example in a kind of revolver motion of the two containers.

The stereolithography apparatus according to the invention can be further developed by having another container with a cover and by having a substrate plate arranged inside the other container, said substrate plate being connected to a coupling rod which is guided through the cover, the frame assembly having an attachment means for selectively securing the container or the other container in a defined position. Another such container, that is to say a second or a third container, may serve different purposes. The stereolithography apparatus according to the invention is particularly suitable for providing one, two or more containers, and for inserting them into the frame assembly or providing them in inserted form, and for placing them alternately, by means of appropriate displacement devices, in such a way that the respective coupling rod of the container can be coupled to the actuator means, or a coupling rod coupled to the actuator means and with a substrate plate attached thereto can be moved into the container. An additional container can thus be used to provide a cleaning fluid with which uncured fluid material can be removed from a completed shaped body. Alternatively, an additional container can be used to provide another, different curable fluid material, with a substrate plate and where relevant a cover and a coupling rod therein, so as to be able to start a production process in this other container after the production process in one container has ended.

The invention also addresses the problem of uneven distribution of light intensity in curing procedures in which a two-dimensional image is formed in a single step on the layer to be cured. Whereas the intensity of exposure is sufficiently equal everywhere in the layer to be cured, in the case of curing or illumination in a scanning method, for example by means of a selectively deflected laser, problems occur in curing methods that involve an imaging process, such as those described in the foregoing, because the intensity of exposure differs from one place to the other within the layer to be cured. These differences are caused by inhomogeneity of the light sources or the optical imaging devices in respect of their spatial distribution of light. Calibrating a stereolithography device to prevent such differences in exposure intensity and to compensate for those inhomogeneities by providing appropriately adapted exposure control is known from WO 2010/045951 A1. However, this increases the production time. Another disadvantage is that, in many stereolithography devices, a change in inhomogeneities occurs in the course of use, so it is necessary or recommended to perform such calibration at regular intervals or even before every production process, in order to achieve a high level of quality for the finished shaped bodies. However, that leads to a further increase in production time.

A stereolithographic method and device using a laser or a UV lamp as the irradiation device is known from EP 0 775 570 A2. In order to compensate for the inhomogeneity of the light intensity from such a radiation source, it is proposed with regard to this technology that a homogenizer be inserted into the beam path. Although such a homogenizer has proved capable of reducing or even eliminating production-based or system-based inhomogeneities in the radiation source, it is not possible to compensate for changes that occur as a result of ageing, contamination and the like. Regular calibration cannot be omitted here, either, therefore, if a high level of production quality is aimed for, so it is again necessary to include a step which is disadvantageous for the production time.

The object of this aspect of the invention is likewise to provide a stereolithography apparatus which allows shaped bodies to be produced more quickly.

This object is achieved, according to the invention, by a stereolithography apparatus comprising: a container for receiving a fluid material curable by radiation, a substrate plate, an actuator means for generating a relative movement between the container and the substrate plate, an irradiation device for selectively irradiating the material arranged in the container, said irradiation device comprising a radiation source and an imaging mask, and a controller for controlling the irradiation device, characterized by a radiation homogenizer which is arranged in the beam path between the radiation source and the imaging mask.

According to this aspect of the invention, the problems of uneven exposure by the radiation source are solved by a radiation homogenizer being inserted between the radiation source and an imaging mask. An irradiation homogenizer of this kind is a beam guidance element that acts by reflecting the beam and/or by refracting the beam, and which is known for optical radiation, for example as a light homogenizer or as a light mixing rod. Such an irradiation homogenizer may be advantageously structured in such a way that it has a radiation inlet surface, proceeding from which the radiation is guided through a radiation guiding volume to a radiation outlet surface, and any radiation rays which do not run directly from the radiation inlet surface to the radiation outlet surface are reflected at side surfaces back into the radiation guiding volume by total reflection or by specular reflection. The radiation homogenizer may be designed specifically as a beam-guiding rod or light wave conductor. It may be rectangular or polygonal in cross-section and may preferably have a cross-section with six or more edges.

The dimensions of one particularly preferred radiation homogenizer are:
length no less than 20 mm, in particular no less than 25 mm or 50 mm, length no greater than 25 mm, in particular no greater than 50 mm or 100 mm,
longest cross-sectional diagonal no less than 2 mm, 4 mm or in particular 8 mm, and/or
longest cross-sectional diagonal no greater than 4 mm, 8 mm or in particular 20 mm.

The radiation homogenizer equalizes inhomogeneities by distributing radiation over the beam cross-section, thereby generating more homogenous radiation over the entire cross-section of the beam. This homogenizing effect typically depends on the dimensions of the radiation homogenizer, e.g., on its length in the beam direction. The radiation homogenizer is preferably designed in such a way that it achieves a homogenizing effect leading to differences in intensity of less than 20%, less than 10% and in particular less than 5% or less than 3%. A difference in intensity is defined here as the difference between the radiation intensity in a local measuring field of the entire irradiated cross-section and the average radiation intensity over the entire irradiated cross-section, expressed in relation to the entire irradiated cross-section.

The homogeneity of the radiation intensity over the exposed area can be calculated as follows: The irradiated cross-section, typically the maximum exposure area on the surface of the substrate plate, is subdivided in the case of a rectangular exposure area into 10×10 equally large measuring fields by subdividing the two edge lengths into 10 equal sub-lengths and defining a chessboard pattern with ten fields. In the case of irradiated cross-sections that are not rectangular, a rectangle is placed around the outer contour of the cross-section and said rectangle is subdivided accordingly into 10×10 measuring fields of equal size. The radiation intensity is then determined with the aid of a measuring sensor with a measured area diameter of 7.5 mm-12.5 mm. Measurement is carried out for each of the 100 measuring fields where the entire measured area of the sensor diameter is fully within the irradiated cross-section when it is placed in the middle of the measuring field. Measuring fields where the measuring sensor of the scanning head projects in the middle position beyond the irradiated cross-section are ignored. Measuring fields may also be smaller than the sensor diameter. An RM-12 radiometer made by the firm of Opsytec Dr. Göbel may be used to measure the radiation intensity, and the sensor used is the one that provided the greatest spectral sensitivity for the respective wavelength.

According to one preferred embodiment, the irradiation device comprises a focusing device, for example an optical lens or a lens device comprising a plurality of optical lens, which is arranged in the beam path between the radiation source and the radiation homogenizer. By means of such a focusing device, the light intensity of the radiation source can be concentrated on the radiation homogenizer in a favorable manner, thus increasing the radiation output.

According to another preferred embodiment, the radiation homogenizer is a beam guiding element that extends in a longitudinal direction from a radiation inlet area to a radiation outlet area and has radiation-reflecting side walls, and the radiation intensity sensor is coupled to a side wall of the radiation homogenizer and the side wall is partially or wholly permeable to radiation in the region where the radiation intensity sensor is coupled thereto. According to this embodiment, the radiation homogenizer may preferably be designed as a beam-guiding rod with a cross-section in the form of a polygonal cross-section with regular or irregular edge lengths, or in the form of a cross-section with some other geometry.

It is also preferred that the radiation homogenizer is a solid body extending along a longitudinal axis and having a polygonal cross-section. A radiation homogenizer of this kind is a proven design, especially when radiation that includes visible light is involved.

It is further preferred that the radiation homogenizer consists of or includes a transparent material, in particular of a glass such as borosilicate crown glass, and has a beam-guiding effect on a beam coupled into the radiation homogenizer via a front face of the radiation homogenizer by total reflection at the side wall or side walls of the radiation homogenizer. A radiation homogenizer of this kind is a cost-efficient component with low loss of radiation power and is used to generate homogeneous radiation.

The stereolithography apparatus may be developed by providing a radiation intensity sensor which is arranged in or at the beam path of the irradiation device in the region in front of the imaging mask to detect the radiation intensity of the radiation source and which is in signal communication with the controller. According to this development of the invention, a radiation intensity sensor is provided. This radiation intensity sensor is arranged and used to detect the radiation intensity of the radiation source. It thus differs from sensor elements which are used to calibrate an irradiation field or irradiation plane and which, to achieve that purpose, scan the irradiated area with a high resolution in respect of the radiation intensities that are locally reached. Such sophisticated sensor technology is avoided, according to the invention, because after setting up the inventive stereolithography apparatus, it is not necessary to detect the radiation intensity with local resolution.

Instead, the radiation from the radiation source passes firstly through a radiation homogenizer and is converted in said radiation homogenizer into a homogenous beam having a uniform radiation field when analyzed with local resolution. Production-related inhomogeneities in the local resolution of radiation intensity from the radiation source are fully compensated in this way.

According to the invention, a radiation intensity sensor is also then provided which detects the radiation intensity of the radiation source in front of the imaging mask. This radiation intensity sensor therefore supplies a signal which characterizes the radiation intensity sensor of the radiation source with a single intensity value and which does not provide any local resolution of the radiation intensity. A simple parameter is thus determined which characterizes a change in radiation intensity from the radiation source, which may occur as a result of ageing, for example, or due to contamination or due to a change in the supply of power to the radiation source. The radiation intensity determined by the radiation intensity sensor is sent to the controller that controls the irradiation device. According to the invention, the controller will therefore provide a simple but useful signal which can be used to control the irradiation device in such a way that changes in the radiation intensity of the radiation source can be compensated.

The invention obviates the need for repeated calibration, therefore, because, by providing combination of a radiation homogenizer and a radiation intensity sensor that measures in a simple manner, it compensates fully for the causes of inhomogeneous or insufficient irradiation that can occur in an irradiation device of the stereolithography apparatus according to the invention. The production process can thus be shortened, and the stereolithography apparatus can be simplified in respect of its constructional and control engineering design.

According to one preferred embodiment of the stereolithography apparatus with a radiation intensity sensor, the radiation intensity sensor is coupled to the radiation homogenizer and detects a part of the radiation introduced into the radiation homogenizer. Coupling the radiation intensity sensor to the radiation homogenizer should be understood, within the meaning of the invention, as a coupling of such a kind that radiation from the radiation homogenizer is directed into the radiation intensity sensor. Such a coupling may be effected by spacing the radiation intensity sensor at a distance from a radiation-emitting surface of the radiation homogenizer. The coupling may be provided directly and more effectively by placing the radiation intensity sensor with a light-guiding surface directly on a light-guiding or light-reflecting surface of the radiation homogenizer, thus partially or completely preventing any reflection of the surfaces, so that the surface of the radiation homogenizer becomes permeable to radiation in the region in which the radiation intensity sensor with its radiation-guiding surface is placed onto it. This kind of coupling allows a robust and reliable set-up for measuring the radiation intensity of the radiation source directly from the radiation homogenizer, without affecting the quality of the radiation for subsequent irradiation in the production process.

It is preferred, in particular, that the radiation intensity sensor is coupled to a side wall of the radiation homogenizer and that the side wall is partially or wholly permeable to radiation in the region where the radiation intensity sensor is coupled thereto. This structure allows a compact measurement set-up that is insensitive to contamination and which delivers measurement results in a reliable manner. A radiation intensity value representative of the entire radiation power emitted by the radiation source is determined in a favorable manner.

It is still further preferred that the controller is adapted to determine a power factor of the radiation source from the sensor data from the radiation intensity sensor and to control the duration of irradiation and/or the amount of energy supplied to radiation source according to said power factor. According to this embodiment, a power factor is determined that can be determined more specifically in such a way that a reference power, or a power which was emitted from the radiation source at a previous point in time, for example at an original time when commissioning the device, is placed in relation to a radiation power that is currently determined by the radiation intensity sensor. This power factor thus provides a relative figure reflecting a reduction in the power of the radiation source and can equally characterize any increase in radiation power. Depending on such a power factor, control or regulation of the device can be performed by the controller. For example, the amount of energy supplied to the radiation source can be increased or decreased in order to compensate for any decrease or increase in radiation intensity. Alternatively or additionally, the duration of irradiation used for curing a layer in the stereolithographic production process may be increased or decreased to compensate for any decrease or increase in the radiation intensity of the radiation source. It should be understood that this type of control or regulation may be performed in such a way that the power of the radiation source is checked at regular intervals, and that the power factor is determined in order to then carry out a general correction of one of the aforementioned parameters. Such regular time intervals may be an operating hour, or several operating hours, for example. This type of compensation may equally well be carried out once for each production process, or for each layer within a production process, or after several layers, for example every fifth layer, in order to increase production precision.

The stereolithography apparatus with a radiation intensity sensor can be developed by providing a temperature sensor which detects the temperature in the region of the radiation intensity sensor and which is coupled to the controller to transmit a temperature sensor signal characterizing said temperature. In this configuration, the controller is preferably adapted to adapt a characteristic measuring curve of the radiation intensity sensor, depending on this temperature sensor signal, or to change a radiation intensity sensor signal, depending on this temperature sensor signal. This development of the invention solves the problem of measured radiation values being dependent on a measurement temperature, and the temperature variations that occur in the stereolithography apparatus according to the invention in the region of the radiation intensity sensor, in that the temperature is detected and a temperature correction is made to the measured value.

According to another preferred embodiment, the controller is adapted to determine an amount of irradiation from the sensor data from the radiation intensity sensor by integrating the radiation intensity over time, and to control the duration of irradiation and/or the amount of energy supplied to the radiation source according to said amount of irradiation. According to this embodiment, the actual amount of irradiation which is emitted from the radiation source during irradiation of a layer to be cured in a production process is determined by means of the radiation intensity sensor. This amount of radiation is calculated by taking the radiation intensity detected by the radiation intensity sensor and integrating it over the duration of irradiation. The amount of radiation thus determined may be used, in turn, to regulate the duration of irradiation, or the amount of energy supplied to the radiation source, or both, in a direct manner, in order to regulate a desired amount of radiation. This is the same as closed-loop control for setting a desired amount of radiation. In one method involving less regulation effort, the amount of radiation determined can be used to perform a general correction and then to determine the amount of radiation at regular intervals, for example at every fifth layer, at every layer in a production process, or after a predetermined number of operating hours, and to carry out any correction that may be needed. This control can be carried out in such a way that the amount of irradiation is determined at every layer and adjusted to a preset figure.

It should be understood, as a basic principle, that the radiation homogenizer may also be provided in all the embodiments and developments of the invention as a development of the initially described invention of a stereolithography apparatus comprising an assembly consisting of the container and the substrate plate.

Another invention relates to a stereolithography apparatus comprising: a container for receiving a fluid material curable by radiation, a substrate plate, an actuator means for generating a relative movement between the container and the substrate plate, an irradiation device for selectively irradiating the material arranged in the container, said irradiation device comprising a radiation source and an imaging mask, and a controller for controlling the irradiation device, in which the controller is adapted to move the substrate plate before irradiation of a layer into a position which provides a cavity with a predetermined layer spacing between a latest layer to be produced and an anti-stick film, to selectively irradiate and thus selectively cure a fluid disposed in the cavity in specific regions, to move the substrate plate, after irradiation of the fluid disposed in the cavity, by a detachment path which is sufficient to separate the selectively cured regions from the anti-stick film, wherein the controller is also adapted to determine the detachment path from the size of the selectively cured regions of the previously cured layer, in particular from a number of irradiated pixels in said layer.

A stereolithography apparatus thus adapted solves a further aspect of the problem of long production time, concerning to the problem of detaching a produced layer from an anti-stick film. It is basically advantageous for the detachment process and for avoiding strong forces, if such an anti-stick film is elastic to a certain extent and lies loosely on a substrate so that it can be detached by peeling. However, this approach requires that the layer be lifted from the anti-stick film by a distance that is greater than the thickness of the next layer to be produced. Furthermore, the distance cannot be clearly predetermined, that is to say, the detachment of the anti-stick film from the layer that has been produced occurs in one case after a shorter distance and in another case after a longer distance. According to the invention, this problem is solved in a way that avoids any complicated apparatus and technology, and which avoid any long, time-consuming paths being traveled, in that the distance by which the substrate plate is raised in order to detach the anti-stick film from the layer most recently produced is determined according to the size of the cured area. According to the invention, an easily calculated parameter is therefore used to determine the distance individually after each coating process. This allows the substrate plate to be raised by only a very small distance for layers in which only a very small proportion has been cured, because in that case the layer is already detached from the anti-stick film after raising it a very short distance. In the case of layers in which a large area has been cured, significantly stronger adhesion between the anti-stick film and the cured area(s) of the layer must be overcome, in contrast, which can only be achieved by moving the substrate plate a greater distance.

In a simple approximation, a proportional relationship between the size of the cured areas of the respective layer and the distance that the substrate plate has to travel can be set. However, it is basically possible to apply other correlations between the surface size and distance in the method of control provided in accordance with the invention. It is particularly preferred that the detachment path be determined from the number of irradiated pixels. A parameter that is particularly easy to calculate and which can be derived directly from the production data is used here to calculate the distance by which the substrate plate must be raised.

It should be understood, as a basic principle, that the controller developed for a detachment path that is dependent on the irradiated area may also be provided in all the embodiments and developments of the invention as a development of the initially described invention of a stereolithography apparatus comprising an assembly consisting of the container and the substrate plate, or the previously described invention of a stereolithography apparatus with a radiation homogenizer.

Another invention relates to a stereolithography apparatus comprising: a container for receiving a fluid material curable by radiation, a substrate plate, an actuator means for generating a relative movement between the container and the substrate plate, an irradiation device for selectively irradiating the material arranged in the container, said irradiation device comprising a radiation source and an imaging mask, and a controller for controlling the irradiation device, in which the substrate plate is rotatably mounted and the rotatable mounting of the substrate plate can be releasably secured against rotation. This development of the invention allows the substrate plate to be held in the stereolithography apparatus such that it is secured against rotation, so that the production process can be carried out with a high level of geometrical precision. However, it is possible to release the anti-rotational mechanism, and the substrate plate can then be rotated, in particular about an axis that is perpendicular to the surface of the substrate plate. Rotation enables surplus fluid material adhering to the shaped body to be thrown off. This can be done after completing the shaped body, in particular, but it can also be done during the production process if, after such rotation, the releasable anti-rotation mechanism can bring the substrate plate back into an exactly defined angular position in a reproducible manner.

Another invention relates to a stereolithography apparatus comprising: a container for receiving a fluid material curable by radiation, a substrate plate, an actuator means for generating a relative movement between the container and the substrate plate, an irradiation device for selectively irradiating the material arranged in the container, said irradiation device comprising a radiation source and an imaging mask, and a controller for controlling the irradiation device, in which an ejector device is provided which has a plunger that can be moved from a production position in which the plunger does not project beyond the substrate plate, into an ejection position in which the plunger projects beyond the substrate plate. The previously described stereolithography apparatus can also be developed by providing an an ejector device which has a plunger that can be moved from a production position in which the plunger does not project beyond the substrate plate, into an ejection position in which the plunger projects beyond the substrate plate.

Such an ejector device is used to detach a completed shaped body conveniently from the substrate plate and to prevent or reduce any risk of the shaped body being damaged in the process. The ejector device may comprise an ejector rod, for example, that extends through a cavity inside the coupling rod and which is connected at the bottom end to the plunger. The plunger may be integrally formed as an end portion of such an ejector rod, or may take the form of a plunger with an enlarged cross-section relative to the ejector rod, or with a plurality of spaced-apart plunger areas. The coupling rod may be designed as a hollow rod for that purpose, and the ejector rod may be guided through the coupling rod.

The stereolithography apparatus provided with an ejector device may be developed by the ejector rod being connected by positive engagement to the coupling rod in order to transfer a rotational movement about the longitudinal axis of the ejector rod. This positive engagement may preferably be provided between the plunger disposed on the ejector rod and the substrate plate disposed on the coupling rod. Rotation between the ejector rod and the coupling rod or substrate plate can be prevented in this way, so such rotation of the substrate plate can be achieved via the ejector rod or a knob attached thereto.

It is still further preferred that the plunger is biased into the raised position by an elastic element such as a spring and is moved by the elastic element into the ejection position. A defined ejection force that gently detaches a completed shaped body can be generated via the elastic element.

Finally, it is preferred that the controller is adapted to control the irradiation device in such a way that a region of material adjacent to the plunger of the ejector device is irradiated differently from the other region in that layer of material, for the layer of material of the shaped body that is closest to the substrate plate. This different irradiation can be carried out in such a way, for example, that the region of material adjacent to the plunger of the ejector device is not irradiated and is consequently not cured, the region of material adjacent to the plunger of the ejector device is irradiated with a lower radiation intensity and is consequently cured to a lesser extent, or the region of material adjacent to the plunger of the ejector device is irradiated with a selective irradiation geometry, for example is irradiated with an irradiation geometry like a honeycomb, a dot pattern or the like, with the result that it is cured only in predetermined regions, This development of the invention results in the shaped body adhering to the plunger more weakly, thus making it easier to detach the shaped body from the plunger after ejection.

It should be understood, as a basic principle, that ejector device thus provided may also be provided in all the embodiments and developments of the invention as a development of the initially described invention of a stereolithography apparatus comprising an assembly consisting of the container and the substrate plate, the subsequently described invention of a stereolithography apparatus with a radiation homogenizer, or the previously described invention of a stereolithography apparatus with a controller which is adapted to determine a detachment path according to the size of the cured area.

According to another aspect of the invention, the problem addressed by the invention is solved by a method of the kind initially specified, in which the container and the substrate plate are jointly inserted as one assembly into the frame assembly. The method implements the core idea of the apparatus, which is to insert the container and the substrate plate as one assembly into the frame assembly and thus to provide them in the form of such an assembly. According to the descriptions above, the container and the substrate plate are positioned relative to each other in a pre-mounted state, in particular in such a way that the substrate plate lies on the bottom of the container.

The method according to the invention may be developed such that selective irradiation is through a bottom plate that is permeable to the radiation from the irradiation device.

The method may be further developed by the container having an inner space in which the substrate plate is arranged and which is shielded by a side wall that laterally encloses it around its entire circumference against radiation with the wavelength of the irradiation from the irradiation device.

The method can be further developed in that a container cover is detachably connected to the container and closes the container, preferably fluid-tightly, and in that the inner space is shielded by the cover against the radiation with the wavelength of the irradiation from the irradiation device.

The method can be further developed in that a coupling rod connected to the substrate plate extends through the cover and that in the cover the movement of the substrate plate relative to the container is performed as an axial movement in the longitudinal direction of the coupling rod.

The method can be further developed in that, when the container is inserted into the frame assembly, the coupling rod is detachably coupled by means of a coupling means to a mechanical actuator, the relative movement between the container and the substrate plate is transferred via the coupling means and the coupling rod, and the coupling rod is released again from the mechanical actuator by the coupling means after the three-dimensional shaped body has been produced, and the container is jointly removed with the coupling rod and the substrate plate as one assembly from the frame assembly.

The method may be further developed, in that production of the shaped body layer by layer is controlled by means of an electronic controller, in that the actuator means and the irradiation device are driven to perform the sequence of steps, and that, before the sequence of steps starts, the electronic controller controls a mixing process in which the actuator means is driven at least once, preferably several times, to perform a reciprocal relative movement over a distance of several layer thicknesses.

The method may be further developed, in that production of the shaped body layer by layer is controlled by means of an electronic controller, in that the actuator means and the irradiation device are driven to perform the sequence of steps, and that, after the last sequence of steps, the electronic controller drives the actuator means to move the substrate plate and the shaped body produced layer by layer into a position above the fluid material in the container.

Another aspect of the invention relates to a method of producing three-dimensional shaped bodies by means of stereolithography, comprising the steps of: securing a container, with a fluid material curable by irradiation disposed therein to a frame assembly, producing the three-dimensional shaped body layer by layer by multiple repetition of a series of steps comprising the steps of: moving a substrate plate detachably mounted on the frame assembly by a predetermined layer thickness relative to the container by means of an actuator means mounted on the frame assembly, filling a cavity ensuing from the relative movement with the fluid material, and selectively curing the material disposed in the cavity by selectively irradiating the material in regions to be cured by means of an irradiation device mounted on the frame assembly, wherein said irradiation is performed by a radiation source generating radiation, said radiation being homogenized in a radiation homogenizer and being selectively guided or selectively shielded in such a way, after passing through the radiation homogenizer, that the areas of the material disposed in the cavity and to be cured are irradiated, and the areas that are not to be cured are not irradiated.

The method may be developed in that the intensity of the radiation is detected by means of a radiation intensity sensor, that sensor signals from the radiation intensity sensor are sent to a controller and that the controller controls the irradiation according to the sensor signals.

The method may be further developed by the controller controlling the irradiation, in that a degree of reduction in the power of the radiation source relative to an original power of the radiation source is determined on the basis of the sensor signals, and the duration of irradiation and/or the amount of energy supplied to the radiation source is increased according to said degree of reduction, or in that an amount of irradiation is determined on the basis of the sensor signals, said amount preferably being determined from the radiation intensity integrated over time, and the duration of irradiation is controlled according to the amount of irradiation, in particular in that irradiation is stopped after reaching a predetermined amount of irradiation.

The method may be further developed by moving the substrate plate before irradiation of a layer into a position which provides a cavity with a predetermined layer spacing between a latest layer to be produced and an anti-stick film, selectively irradiating and thus selectively curing a fluid disposed in the cavity in specific regions, moving the substrate plate, after irradiation of the fluid disposed in the cavity, by a detachment path which is sufficient to separate the selectively cured regions from the anti-stick film, wherein the detachment path is determined from the size of the selectively cured regions, in particular from a number of irradiated pixels.

The method may be developed still further, in that the detachment path is determined to be all the greater the larger the selectively cured regions area, or the greater the number of irradiated pixels.

The method may be developed still further, in that the completed shaped body is removed from the substrate plate by means of a plunger which is inserted flush into the substrate plate and connected to an ejector rod.

Finally, the method may be further developed in that uncured fluid is removed from the shaped body by rotating the substrate plate after completion of the shaped body.

With regard to the features of the method defined in these methods and developments of the method, reference is made to the corresponding device features, according to which the devices may preferably be designed in order to implement these steps of the method in the device according to the invention. The descriptions, alternatives and advantages mentioned in this regard are applicable analogously to the respective developments of the method according to the invention.

A preferred embodiment shall now be described with reference to the attached Figures, in which.

Figure 1:
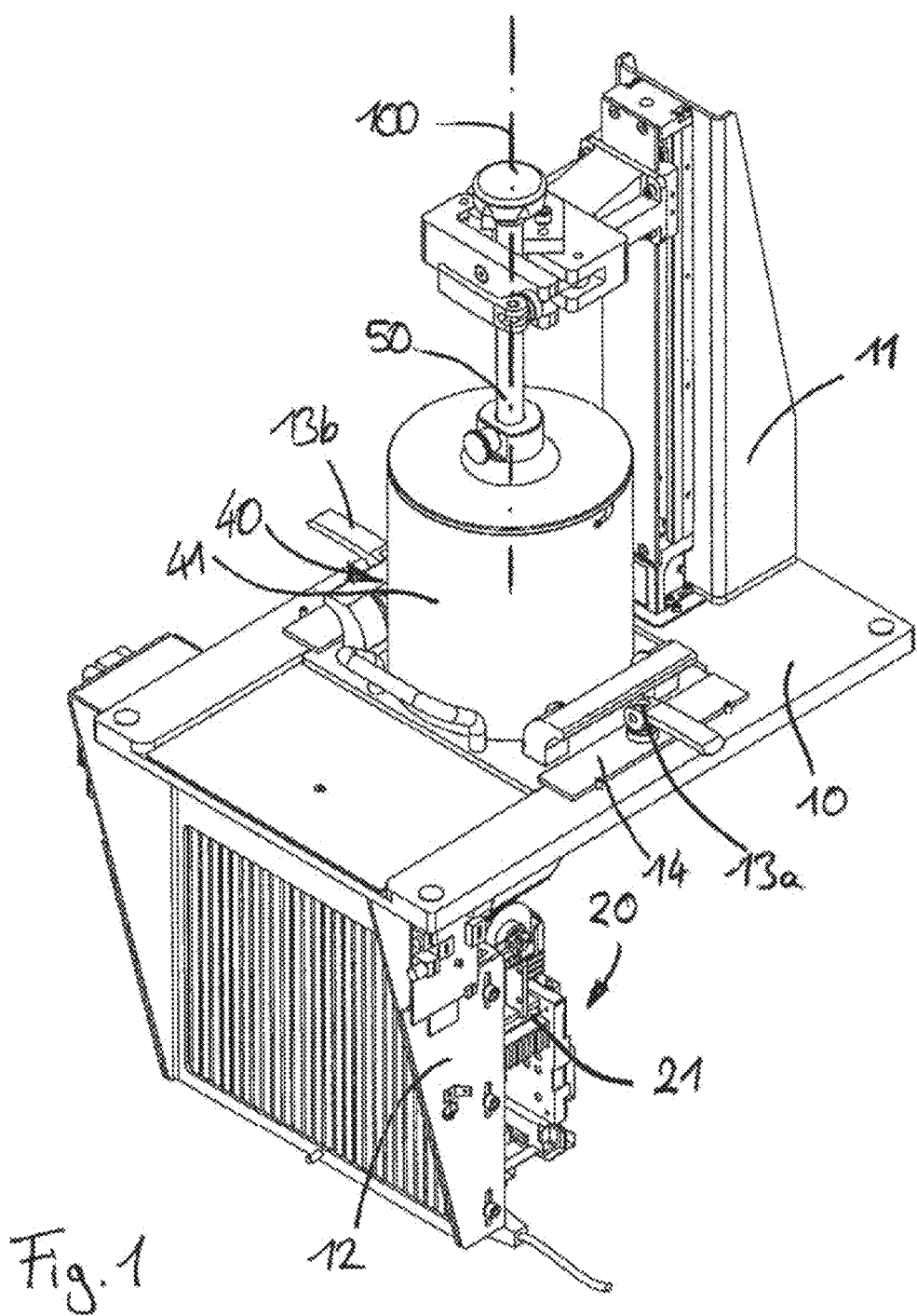
FIG. 1 shows a perspective view of a preferred embodiment of the invention, viewed from an angle from the side and from above.
Figure 2:
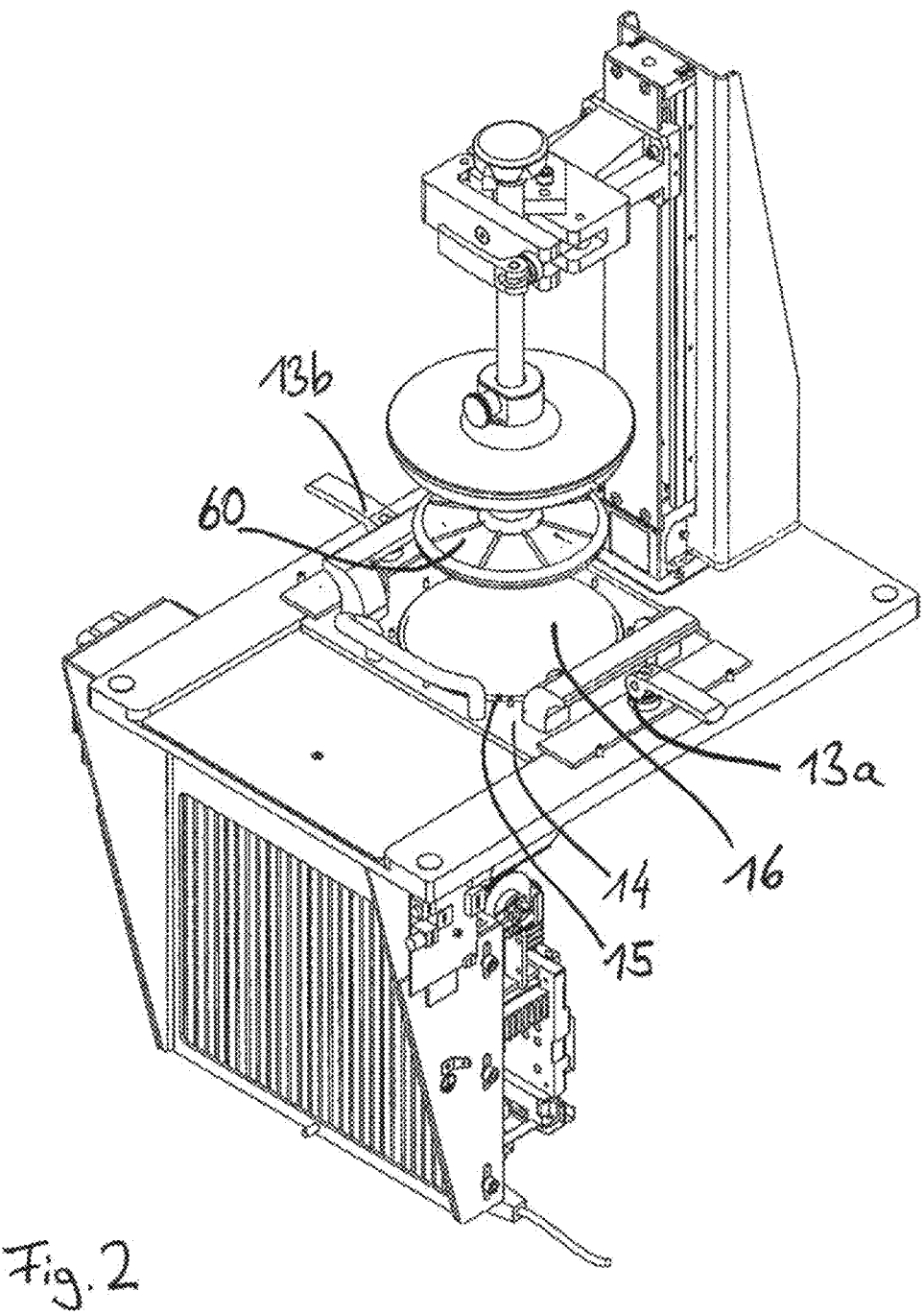
FIG. 2 shows a view according to FIG. 5, with the container removed.
Figure 6:
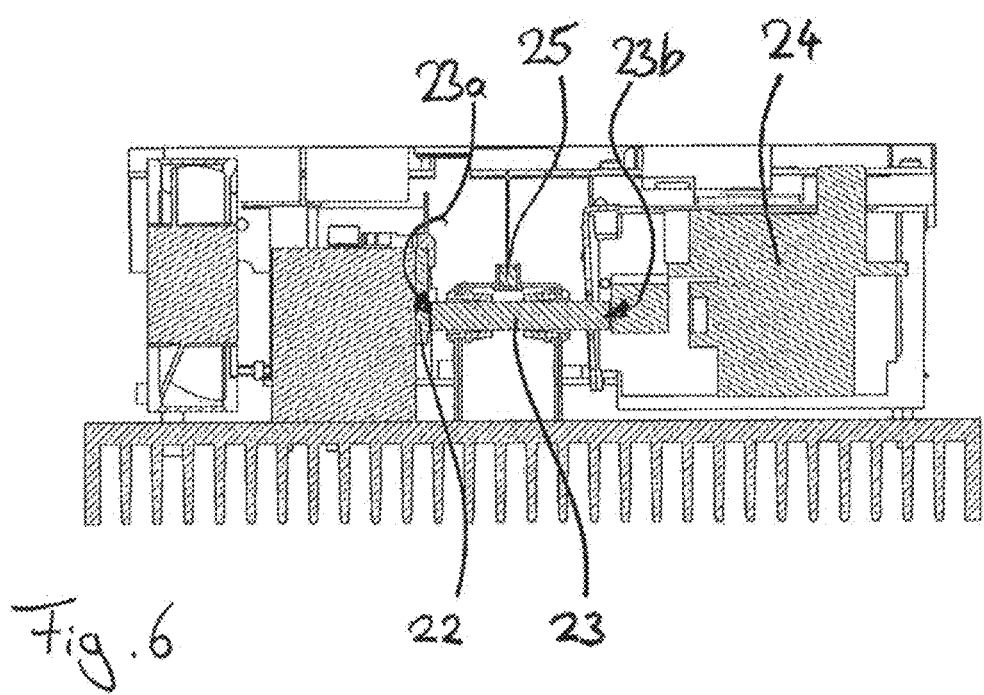

FIG. 4 shows a longitudinal cross-sectional side view of the embodiment according to FIG. 1, with FIG. 4a showing a detailed view of region X in FIG. 4, FIG. 5 shows a longitudinal cross-sectional perspective view of the embodiment according to FIG. 1, viewed at an angle from below, with FIG. 5a showing a detailed view of region Y in FIG. 5, and FIG. 6 shows a longitudinal cross-sectional rear view of the embodiment of the irradiation device according to FIG. 1.

Referring now to the Figures, a stereolithography apparatus according to the invention has a frame assembly which is basically assembled from a base plate 10, a frame pillar 11 disposed thereon and a rack 12 attached to the underside of base plate 10. An irradiation device 20, which is basically arranged underneath base plate 10, is attached to rack 12. The irradiation device is in the form of a projector and comprises a digital projector unit 21 with an objective lens, which may use LCD, DLP, LED or LCOS projector technology, for example. It is possible to project an entire image with the aid of the projector and thus to selectively irradiate particular areas within a layer plane.

Projector unit 21 is arranged underneath the base plate and has a beam path that is oriented vertical upwards. Projector unit 21 is coupled to a controller 30, which has an external signal input with which the sequence of images from projector unit 21 can be controlled for the individual sequential steps in producing the layered structure of the three-dimensional shaped body.

It should be understood, as a basic principle, that instead of the projector unit with an objective lens, it is also possible for other irradiation devices to be provided, also for irradiation by means of laser, for example. The laser beam can be deflected in such a way by suitable mirrors or other deflection systems that selective irradiation is performed by means of the laser.

Irradiation device 20 is direct from below at a window 16 which is set into base plate 10. Coupling means 13a, b are attached to base plate 10 laterally from window 16. Said coupling means 13a, b are used to lock a container support plate 14 in a defined position relative to base plate 10 and for that purpose have respective toggle clamp elements.

An opening surrounded by an annular positioning aid 15 is provided in container support plate 14. Positioning aid 15 is in the form of a centering ring and is used to position a container 40 in a defined position on container support plate 14 and thus in a defined position relative to base plate 10.

Container 40 is in the form of a cylindrical container with a side wall 41 of circular cross-section. Side wall 41 is made of a material which is impermeable to radiation from irradiation device 20, and in particular of a material that is impermeable to visible light and UV light. The longitudinal axis of cylindrical container 40 extends vertically and is marked with reference sign 100.

Along longitudinal axis 100, a coupling rod 50 extends from above into the interior of container 40. At its bottom end, coupling rod 50 bears a substrate plate 60 which is circular in cross-section and thus shaped like a plate. Substrate plate 60 is securely connected to coupling rod 50.

At its outer edge, the substrate plate has a circumferential collar 61, which can be seen in the detailed view in FIG. 4a and which extends downwards by a small height of 0.05 mm. The purpose of the collar is to provide a spacing, appropriate for producing the first layer, between substrate plate 60 and an anti-stick film 44a disposed above a bottom plate 44 of container 40. Collar 61 also ensures that, when there is relative movement between the substrate plate and the anti-stick film, the anti-stick film 44a is not subject to wear and tear in the relevant exposure area in the middle, but only in the outer collar region.

The coupling rod is secured to frame pillar 11 by means of a coupling rod clamp unit 51. Said coupling rod clamp unit 51 comprises, for its part, a toggle clamping device and is designed to clamp the coupling rod in a force-locking manner. If necessary, positive engagement between the coupling rod and the coupling rod clamp unit may be provided to produce a defined position for the coupling rod in the longitudinal direction of axis 100 between the coupling rod clamp unit 51 and coupling rod 50, so that exact referencing of the coupling rod position relative to frame assembly 10, 11 is possible.

The coupling rod has a annular groove 50a which is worked into its outer circumferential surface at such a height that a positioning pin 43 engaging with said annular groove supports coupling rod 50 axially. In this supported position, substrate plate 60 is raised to an uppermost position, and a completed shaped body is typically arranged outside the fluid bath. This position, axially fixed in such a way, allows a rotational movement to be exerted on the shaped body via the substrate plate and can serve to throw surplus fluid off the shaped body. This surplus fluid is then thrown against side walls 41 and can flow or drip into the fluid bath and thus be recovered.

The coupling rod clamp unit 51 is movably guided at frame pil's lar 11 for movement in the direction of the cylindrical longitudinal axis 100. Inside frame pillar 11, an actuator unit is disposed which is used to move the coupling rod clamp unit and thus the coupling rod 50 attached thereto in the vertical direction and in this way to provide the successive vertical movement that is necessary for layer-by-layer production of a shaped body on the substrate plate. The actuator unit insider frame pillar 11 is preferably embodied as a spindle drive 52 which is driven by a stepper motor 53 forming a mechanical actuator.

Between the coupling rod clamp unit 51 and substrate plate 60, coupling rod 50 is guided in a cover 42 for axial movement in its longitudinal direction. Cover 42 is likewise made of a material which is impermeable to the radiation from irradiation device 20, in particular of a material which is impermeable to visible light and UV radiation. Cover 42 is inserted fluid-tightly, by means of a shoulder with an O-ring seal, into the opening formed at the top side of side wall 41 of the container. A hole through the middle of the cover provides axial guidance for coupling rod 50. Coupling rod 50 can be axially fixed in the cover with the aid of annular groove 50a, by means of a screw 43 which engages radially into the hole in the cover, in order to fix a particular vertical position of substrate plate 60 inside container 40.

FIGS. 5 and 5a show an ejector mechanism which serves to detach a completed shaped body from the substrate plate. The ejector mechanism comprises an ejector rod 70 which is guided inside coupling rod 50 designed as a hollow rod, and which runs coaxially with coupling rod 50. At the top end of ejector rod 70, a knob 71 is disposed which is used to transfer an axial force to the ejector rod and to rotate the ejector rod.

Ejector rod 70 extends all the way through coupling rod 50 and is connected at its bottom end to an ejector plate 72 in the region of substrate plate 60. Ejector plate 72 has a star-shaped geometry and fits into a matching star-shaped recess 62 in substrate plate 60. This produces positive engagement that stops any rotation between the ejector plate and the substrate plate or coupling rod. At its top end, the ejector rod has an external thread which co-operates with an internal thread in knob 71. Knob 71 rests on the top end face of coupling rod 50, and by turning knob 71 about longitudinal axis 100 the actuation rod can therefore be moved relative to the coupling rod and in particular can be pulled into the raised position. When ejector rod 70 is up in its maximum end position, the star-shaped ejector plate 72 lies in the matching star-shaped recess 62 in substrate plate 60, and the bottom surfaces of ejector plate 72 and substrate plate 60 are flush with each other. Ejector plate 72 is biased into this upper position by means of a coil spring 73 designed as a pressure spring. When knob 71 is turned, thus lowering the ejector rod from its uppermost position, coil spring then exerts an ejecting force on the ejector plate which is sufficient to detach a completed shaped body from the substrate plate and which can be increased, if necessary, in the event of shaped bodies sticking to the substrate plate, by exerting pressure on knob 71.

Due to the spring force and any pressure that is additionally exerted, the ejector plate with its bottom surface projects from the bottom surface of substrate plate 60 and exerts a pressure on a shaped body formed on the substrate plate and the ejector plate. The shaped body is detached in this way from the surface of the substrate plate.

It is possible that the shaped body is still stuck to the surface of ejector plate 72. However, when producing the first layer to be formed directly on substrate plate 60, the process can be controlled in such a way that no exposure to radiation occurs in the star-shaped region of ejector plate 72, with the result that a cavity is formed there and no adhesion to the ejector plate occurs. This means that the shaped body can be completely detached from the substrate plate by means of ejector plate 72.

Positive engagement between ejector plate 72 and substrate plate 60 is achieved due to the star-shaped contour of ejector plate 72 and of recess 62. This positive engagement can transfer a rotational movement initiated via knob 71 from ejector rod 70 to substrate plate 60. This allows a rotational movement to be applied to the substrate plate and to a shaped body formed thereon. This rotational movement is specifically helpful when the coupling rod is locked in a raised position with the aid of annular groove 50a, and the completed shaped body is held as a result above the fluid bath to allow uncured fluid to be thrown off the shaped body by the centrifugal forces thus produced, and to drip into the fluid bath.

FIG. 5a shows the setup comprising the FEP film or anti-stick film 44a lying on top and facing towards the interior of container 40, and the bottom plate 44 of container 40, typically made of glass, that is disposed immediately below it. In the edge area, the bottom plate and the FEP film are sealed by a circumferential O-ring 48 against side wall 41 and against each other. The glass plate is fixed in place by means of a flange 49 underneath it and a screwed flange connecting screw 49a, and the O-ring seal is squeezed as a result to produce the sealing effect.

On its underside, the container has a bottom plate 44 which is permeable to radiation. The bottom plate is inserted with positive engagement and sealingly into container side wall 41 and allows the radiation from irradiation device 20 to pass through into the interior of the container and in particular to the underside of substrate plate 60.

As can be seen from the detailed view in FIG. 5a, the FEP film 44a is disposed on the top side of the bottom plate, that is, on the side facing towards the interior of the container, and is spanned fluid-tightly across its entire area between the side wall and bottom plate of the container. A very small volume of gas, having a thickness in the vertical direction of preferably no more than 0.1 mm, is enclosed between the bottom plate and the FEP film. This spanning of the film, combined with the volume that is fluid-tightly enclosed, allows the shaped body to be separated from the film with little force by vertically lifting the shaped body by means of a peeling effect achieved by a change in the geometry of the volume that is fluid-tightly enclosed.

Cover 42 is locked into place, like a bayonet lock, by lateral pins 45 in the side wall 41 of container 40. Container 40 and substrate plate 60 are pre-mounted as one assembly that also includes cover 42. This pre-mounted assembly comprising container 40 and substrate plate 60 can then be inserted into the frame assembly by inserting the container with its underside into centering ring 15. Coupling rod 50 can then be fixed in position by means of coupling rod clamp unit 51 on frame pillar 11, thus producing the coupling for vertical displacement of substrate plate 60.

After coupling rod clamp unit 51 has been released, container 40 together with coupling rod 50 and substrate plate 60 disposed therein can be moved onto base plate 10 by releasing coupling means 13a, b and pulling container support plate 14 forwards with the aid of a handle 16 attached thereto. This allows the entire assembly comprising container support plate 14, container 40, substrate plate 60 and coupling rod 50 to be moved or removed from the apparatus, or to insert these components jointly into the stereolithography apparatus. This allows the container, together with the fluid therein, to be replaced quickly, so that after the process of producing a three-dimensional shaped body inside the container on the underside of substrate plate 60 has been completed, production can be immediately carried out in a second container, following replacement. The production cycle times that can be achieved with the stereolithography apparatus according to the invention are substantially reduced compared to the prior art, while also achieving a simultaneous improvement in the long-term quality of the curable fluid inside the containers used for production, due to their being encapsulated against dirt and the effect of light inside container 40.

Figure 3:
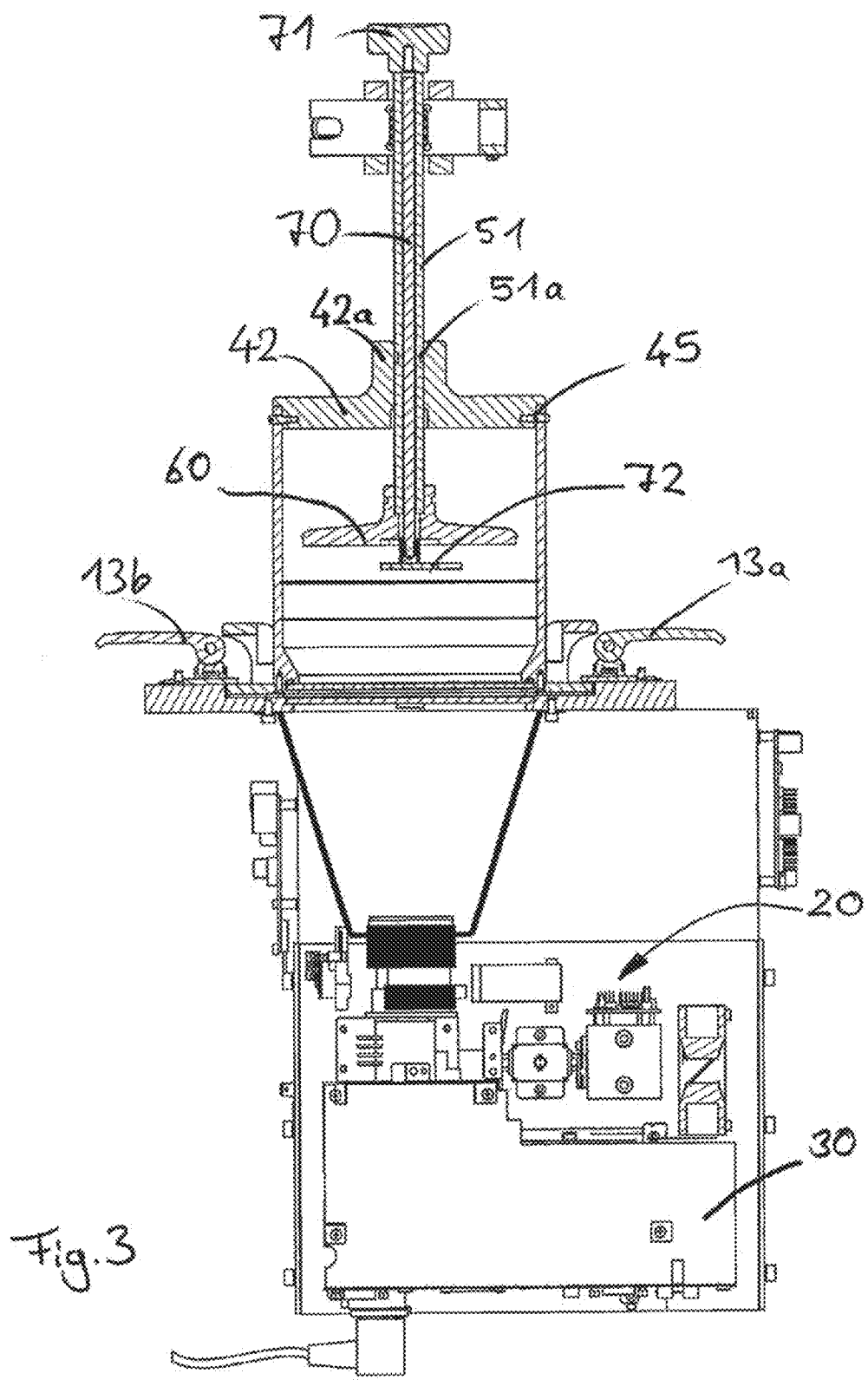
FIG. 3 shows a longitudinal cross-sectional frontal view of the embodiment according to FIG. 1.
Figure 3A:
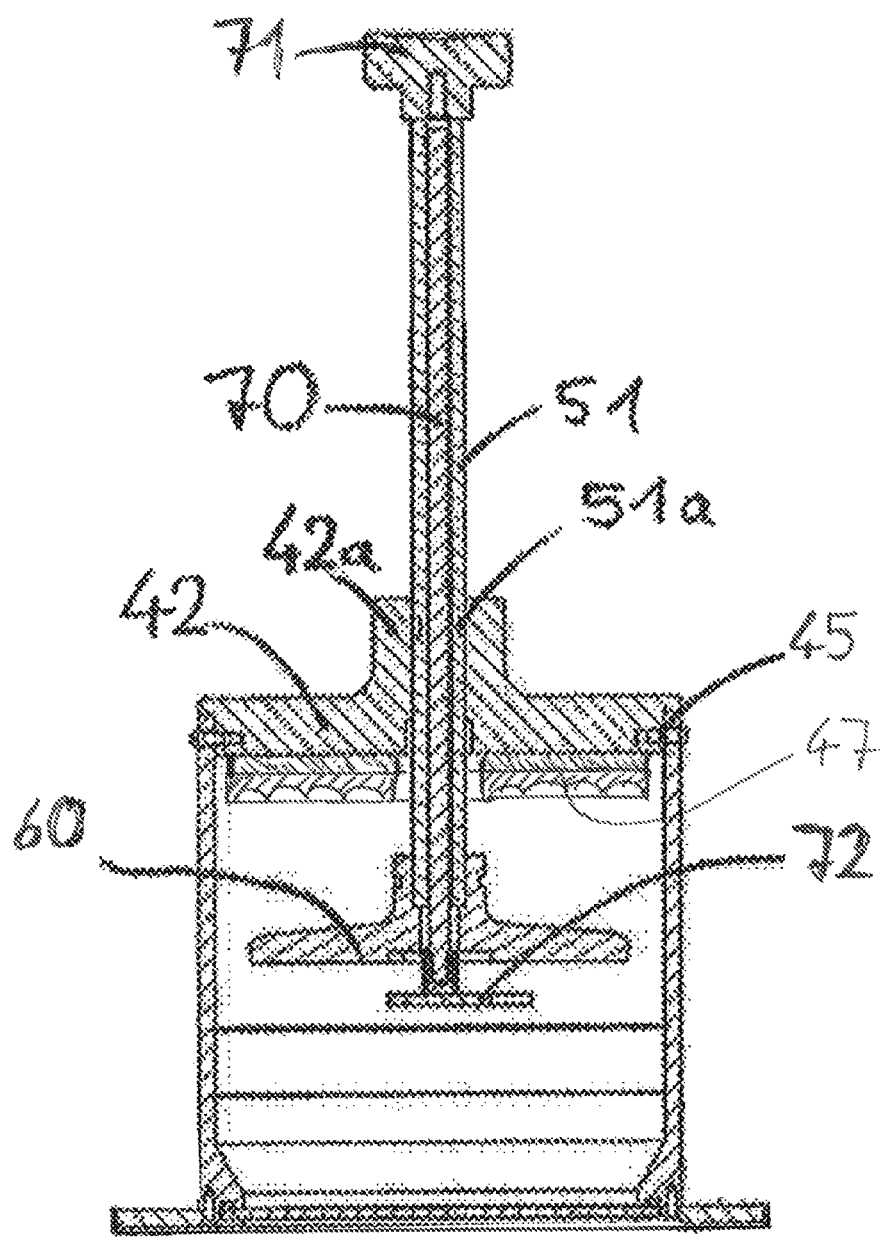
FIG. 3a shows a further, second container for being placed in the preferred embodiment according to FIG. 1

FIG. 3A shows a further, second container. In this figure, identical components to the first container shown in FIGS. 1-3 and 4 are referenced with identical reference numerals. The further, second container shown in FIG. 3A may be positioned inside the stereolithography apparatus to replace the first container. An illumination device 47 is arranged inside the further, second container. This illumination device 47 is adapted to illuminate the inner space of the second container with visible light having a wavelength that is not suitable for curing the fluid material. It is understood that such illumination device may be arranged in the first container as well.

FIG. 6 shows irradiating device 20 in a cutaway view. Irradiation device 20 includes a high-power LED 22 that emits radiation containing visible light components in a horizontal direction. The light is coupled almost entirely into a light homogenizer 23. The light homogenizer is a rod of hexagonal cross-section that extends in a horizontal axial direction and which is made of borosilicate crown glass. Said light homogenizer ensures that inhomogeneous light entering its inlet end 23a from LED 22 is homogenized by multiple reflection at the side walls of the light homogenizer and exists as a homogenous field of light on outlet surface 23b at its end face.

From outlet surface 23b, the light shines into an opening in an image converter 24. Said image converter 24 can be designed as a DLP element or as LCD technology. Image converter 24 is controlled by the controller and generates a masked image from the homogenous incident light beam, said image being image of the cross-sectional area of the shaped body to be produced, and corresponding to the respective layer to be produced. All the regions of the shaped body that are solid and which are therefore to be cured from the fluid, are unmasked and are exposed to the homogenous light, whereas all the other regions are masked and are consequently not exposed.

Inside image converter 24, the homogenous and masked light is then reflected by 90° and is emitted vertically upwards from irradiation device 20.

A light intensity sensor 25 is arranged at the side of light homogenizer 23. The light intensity sensor is inserted in a cover plate adjacent to light homogenizer 23, and detects a light intensity at the side wall of light homogenizer 23. This light intensity correlates with the light intensity that is emitted from LED 22 and which passes through light homogenizer 23. The light intensity sensor 25 is connected to controller 30 for signal transmission and sends a signal correlating to the light intensity of the LED to controller 30, which signal is then used inside the controller to control the production process.

The light intensity sensor may be provided in the form of a photodiode, which then allows it to be operated simultaneously as a temperature sensor, due to the approximately linear relationship between the temperature and the forward voltage of the P-N semiconductor junction. The combination of light intensity and temperature sensor can then measure the light intensity and the temperature alternately, thus allows the light intensity to be detected with correction for temperature. In this way, it is possible to compensate for inaccuracies in the measured values from the light intensity sensor, due to drift caused by temperature changes. As an alternative thereto, it is possible to arrange a separate temperature sensor adjacent to the light intensity sensor and to detect the temperature of the light intensity sensor via said temperature sensor.

A production process according to the invention proceeds as follows:

A container 40 filled with the curable fluid is pre-mounted together with substrate plate 60, which is attached to coupling rod 50, and a container cover 42, which guides said substrate plate in the axial direction. This pre-mounted assembly comprising the container and the substrate plate and the coupling rod is then placed on top of container support plate 14, and container support plate 14 is them pushed into the production position shown in the Figures and locked in said position by means of coupling means 13a, b.

Substrate plate 60 lies on anti-stick film 44a above bottom plate 44 of container 40 in a reference position defined by collar 61. Substrate plate 60 is left in that position, and coupling rod 50 is coupled by means of coupling rod clamp unit 51 to the actuator unit for vertical movement of the substrate plate.

These are already all the preparatory steps for carrying out the stereolithographic production process. After, or also before the assembly was inserted into the stereolithography apparatus, the data required for selective irradiation of the individual layers were sent to controller 30. However, the data may also be transmitted from an external controller in real time during the production process, via an appropriate interface.

On its underside, the container has a bottom plate 44 which is permeable to radiation. The bottom plate is inserted with positive engagement and sealingly into container side wall 41 and allows the radiation from irradiation device 20 to pass through into the interior of the container and in particular to the underside of substrate plate 60.

Once the coupling rod clamp unit 51 has been attached to the coupling rod 50, the substrate plate is initially raised a number of layer thicknesses by the actuator unit, for example a distance of 2 cm, then lowered again into its original position resting on the base plate in order to mix the fluid in the container thoroughly. This operation may be carried out several times if need be.

The production process is then controlled via controller 30 or, if necessary, by the external controller. The first layer can be produced directly by exposure to light, because the substrate plate already rests with a suitable spacing on anti-stick film 44a due to collar 61. The second layer is then produced. In a first step, substrate plate 60 is raised several layer thicknesses from the anti-stick film by means of the actuator unit, via coupling rod clamp unit 51 and coupling rod 50. The anti-stick film is separated in the process from the first layer that was produced. This separation process is supported by a peeling effect that is produced by an underpressure that forms between anti-stick film 44a and bottom plate 44, and by the pulling force of the substrate plate that is exerted vertically upwards. The distance by which the substrate plate is raised in order to achieve detachment can be controlled by means of a force sensor that measures the lifting force and registers detachment as a sudden drop in force.

Alternatively, the distance by which the substrate plate is raised from the anti-stick film in order to detach the anti-stick film can be calculated in a controller from the area of the layer that was previously irradiated. The greater the irradiated area of the previously produced layer, i.e., the greater the number of previously irradiated pixels, the greater said distance must be.

Once the substrate plate has been raised the required distance, and the anti-stick film has been detached from the most recently produced layer, the substrate plate is lowered again. It is lowered by said distance minus the thickness of the next layer to be produced. When the substrate plate has been lowered, a gap is thus created between the most recently produced layer and the anti-stick film, said gap being equal to the thickness der of the next layer to be produced.

Due to the filling level of the fluid, curable material in container 40, the material is drawn into or flows into the cavity that thus ensues between the bottom plate and the substrate plate due to the upward movement of the substrate plate. After the substrate plate has been lowered again, the gap has therefore been filled in a reliable manner with fluid.

After that, the layer thus formed is exposed to a respective image emitted from projector unit 21, resulting in selective curing of particular areas within that layer. Due to the coating on the bottom plate of container 40, these cured areas do not adhere to the bottom plate, but only to the substrate plate.

Following that, the actuator unit is activated once again to raise substrate plate 60 by an other layer thickness. A gap with the thickness of a layer is created once again between the previously cured layer and the bottom plate of the container. This gap is filled once again with the fluid, curable material and is again exposed to light, by illumination with an image corresponding to the cross-sectional geometry of this layer of the shaped body being formed, and thus cured. The cured areas of the layer are joined thereby to the previously cured layer, but not to the bottom plate of container 40.

This sequence of steps is repeated several times in succession until the entire shaped body has been formed layer by layer in this manner. After that, substrate plate 60 is raised by the actuator unit to a raised position above the fluid bath so that uncured fluid can drip off the shaped body. After a specific period of time has elapsed, the assembly consisting of the container, the substrate plate with the shaped body formed thereon, and the coupling rod can be conveniently removed from the stereolithography apparatus by releasing the coupling rod clamp unit 51 and pulling forward container support plate 14, in order to carefully separate the shaped body thus produced from the substrate plate. Immediately after the assembly has been removed, a second assembly consisting of a container, a substrate plate, a cover and a coupling rod can be placed on container support plate 14, and a second production process can be started immediately.

The invention claimed is:

1. A stereolithography apparatus comprising:
    a container for receiving a fluid material curable by irradiation,
    a substrate plate,
    an actuator for generating a relative movement between the container and the substrate plate,
    wherein the actuator comprises a coupling rod,
    an irradiation device for selectively irradiating the fluid material arranged in the container, said irradiation device positioned below the container and comprising a radiation source and an imaging mask,
    a controller for controlling the irradiation device,
    wherein the actuator and the irradiation device are mounted on a frame assembly, wherein the coupling rod is secured to a frame pillar which is part of the frame assembly, and wherein an actuator unit is disposed for moving the coupling rod via a coupling rod clamp unit, said coupling rod clamp unit comprising a toggle clamping device for selectively clamping the coupling rod and releasing the coupling rod,
    wherein the container comprises an opening formed at a top side of a side wall of the container, wherein the opening is closed by a detachable cover that is detachably connected to said container,
    wherein the container with the opening being closed by the detachable cover, the substrate plate, and the coupling rod are combined to form an assembly, wherein the assembly comprising the container, the cover, the substrate plate, and the coupling rod is jointly inserted into the frame assembly, detachably secured therein by means of an attachment and configured to be jointly removed from the frame assembly,
    wherein the detachable cover comprises a cover opening through which the coupling rod extends, wherein the cover is contained in the assembly,
    wherein the coupling rod has a longitudinal axis and wherein the actuator unit is disposed for moving the coupling rod via the coupling rod clamp unit in order to provide a defined position for the coupling rod in a longitudinal direction of the longitudinal axis of the coupling rod,
    wherein the container has a bottom plate which is permeable to radiation from the irradiation device and the irradiation device is adapted to introduce the radiation into the container from below.

2. The stereolithography apparatus according to claim 1, wherein the container has a side wall that is impermeable to radiation from the irradiation device.

3. The stereolithography apparatus according to claim 1, wherein in the cover is substantially impermeable to the radiation from the irradiation device, the cover configured to close the container.

4. The stereolithography apparatus according to claim 1, wherein the coupling rod is connected to the substrate plate, extends through the cover, and is guided in the cover for axial movement in a longitudinal direction of the coupling rod.

5. The stereolithography apparatus according to claim 1, wherein the coupling rod is connected to the substrate plate and the coupling rod is detachably coupled by a coupling member to a mechanical actuator to transfer relative movement between the container and the substrate plate;
    an illumination device which is arranged inside the container and which is adapted to illuminate an inner space of the container with visible light having a wavelength that is not suitable for curing the fluid material, and
    a second container with an illumination device arranged inside said second container and adapted to illuminate an inner space of the second container with radiation having a wavelength that is suitable for curing the fluid material, wherein the frame assembly has an attachment for selectively securing the container or the second container in a defined position.

6. The stereolithography apparatus according to claim 1, comprising a further container with a cover and a further substrate plate arranged inside the further container and connected to the coupling rod guided which is through the cover, wherein the frame assembly has an attachment for selectively securing the container or the further container in a defined position.

7. The stereolithography apparatus according to claim 1, wherein the container has a bottom plate which is permeable to the radiation from the irradiation device and the irradiation device is adapted to introduce the radiation into the container from below;

on a side of the bottom plate facing the interior of the container comprising an anti-stick coating applied thereto, or an anti-stick film arranged thereon which is sealed fluid-tightly in its peripheral region against the bottom plate and encloses a very small volume between the bottom plate and the anti-stick film; and wherein the bottom plate is detachably and sealingly connected to the side wall of the container.

8. The stereolithography apparatus according to claim 1, wherein a radiation homogenizer is arranged in a beam path between the radiation source and the imaging mask.

9. The stereolithography apparatus according to claim 8, wherein the irradiation device comprises a focusing device comprising an optical lens or a lens device comprising a plurality of optical lens, which is arranged in the beam path between the radiation source and the radiation homogenizer, and characterized in that the radiation homogenizer is a beam guiding element that extends in a longitudinal direction from a radiation inlet area to a radiation outlet area and has radiation-reflecting side walls.

10. The stereolithography apparatus according to claim 8, wherein the radiation homogenizer is a solid body extending along a longitudinal axis and having a polygonal cross-section.

11. The stereolithography apparatus according to claim 8, wherein the radiation homogenizer consists of or includes a transparent material, wherein the transparent material is a glass including borosilicate crown glass, and has a beam-guiding effect on a beam coupled into the radiation homogenizer via a front face of the radiation homogenizer by total reflection at the side wall or side walls of the radiation homogenizer, and characterized by a radiation intensity sensor which is arranged in or at the beam path of the irradiation device in the region in front of the imaging mask to detect the radiation intensity of the radiation source and which is in signal communication with the controller, and characterized in that the radiation intensity sensor is coupled to the radiation homogenizer and detects a part of the radiation introduced into the radiation homogenizer, in particular by the radiation intensity sensor being coupled to a side wall of the radiation homogenizer and by the side wall being partially or wholly permeable to radiation in the region where the radiation intensity sensor is coupled thereto.

12. The apparatus of claim 1, wherein the coupling rod is guided for axial movement in a longitudinal direction in a cover which is impermeable to radiation from the irradiation device and detachably connected to the container.

13. A stereolithography apparatus comprising:
a container for receiving a fluid material curable by irradiation,
a substrate plate,
an actuator for generating a relative movement between the container and the substrate plate,
wherein the actuator comprises a coupling rod,
an irradiation device for selectively irradiating the fluid material arranged in the container, said irradiation device positioned below the container and comprising a radiation source and an imaging mask,
a controller for controlling the irradiation device,
wherein the actuator and the irradiation device are mounted on a frame assembly, wherein the container and the substrate plate are combined to form an assembly, wherein the assembly comprising the container and the substrate plate is jointly inserted into the frame assembly, detachably secured therein by means of an attachment and configured to be jointly removed from the frame assembly,
wherein the coupling rod is secured to a frame pillar which is part of the frame assembly, and wherein an actuator unit is disposed for moving the coupling rod via a coupling rod clamp unit,
wherein the container comprises an opening formed at a top side of a side wall of the container, wherein the opening is closed by a detachable cover that is detachably connected to said container,
wherein the detachable cover comprises a cover opening through which the coupling rod extends, wherein the cover is contained in the assembly,
wherein the coupling rod has a longitudinal axis and wherein the actuator unit is disposed for moving the coupling rod via the coupling rod clamp unit in order to provide a defined position for the coupling rod in a longitudinal direction of the longitudinal axis of the coupling rod
wherein a radiation homogenizer is arranged in a beam path between the radiation source and the imaging mask
wherein the radiation homogenizer has a homogenizing effect for reducing a largest difference in intensity to less than about 20%
wherein the largest difference in intensity is defined as the difference between the radiation intensity in a local measuring field of the entire irradiated cross-section and the average radiation intensity over the entire irradiated cross-section, expressed in relation to the entire irradiated cross-section and is calculated as follows:
the irradiated cross-section is subdivided, in the case of a rectangular exposure area, into 10×10 measuring fields of equal size by subdividing the two edge lengths into 10 equal sub-lengths to define a chessboard pattern with ten fields, or in the case of irradiated cross-sections that are not rectangular, a rectangle is placed around the outer contour of the cross-section and said rectangle is subdivided accordingly into 10×10 measuring fields of equal size,
the radiation intensity is then determined with the aid of a measuring sensor with a measured area diameter of between about 7.5 mm and 12.5 mm for each of the 100 measuring fields where the entire measured area of the sensor diameter is fully within the irradiated cross-section when it is placed in the middle of the measuring field, wherein measuring fields where the measuring sensor of the scanning head projects in the middle position beyond the irradiated cross-section are ignored,
the maximum value, the minimum value and the mean value are calculated from the radiation intensities thus determined,
the largest difference in intensity is then calculated as the largest of the values:

100×(maximum value−mean value)/mean value and 100×(mean value−minimum value)/mean value.

14. The stereolithography apparatus according to claim 13,
wherein the controller is adapted to determine an amount of irradiation from the sensor data from the radiation intensity sensor by integrating the radiation intensity over time and to control the duration of irradiation and/or the amount of energy supplied to the radiation source according to said amount of irradiation, and
characterized in that the substrate plate is rotatably mounted and that the rotatable mounting of the substrate plate can be releasably secured against rotation.

15. A stereolithography apparatus comprising:
a container for receiving a fluid material curable by irradiation,
a substrate plate,
an actuator for generating a relative movement between the container and the substrate plate,
wherein the actuator comprises a coupling rod having a longitudinal axis,
wherein the actuator is disposed for moving the coupling rod via a coupling rod clamp unit in order to provide a defined position for the coupling rod in a longitudinal direction of the longitudinal axis of the coupling rod, said coupling rod clamp unit comprising a toggle clamping device for selectively clamping the coupling rod and releasing the coupling rod,
an irradiation device for selectively irradiating the fluid material arranged in the container, said irradiation device positioned below the container and comprising a radiation source and an imaging mask,
a controller for controlling the irradiation device,
wherein the actuator and the irradiation device are mounted on a frame assembly,wherein the container comprises an opening formed at a top side of a side wall of the container, wherein the opening is closed by a detachable cover that is detachably connected to said container,
wherein the container with the opening being closed by the detachable cover, the substrate plate, and the coupling rod are combined to form an assembly, wherein the assembly comprising the container, the cover, the substrate plate, and the coupling rod is jointly inserted into the frame assembly, detachably secured therein by means of an attachment and configured to be jointly removed from the frame assembly,
wherein the detachable cover comprises a cover opening through which the coupling rod extends, wherein the detachable cover is contained in the assembly,
wherein the container has a bottom plate which is permeable to radiation from the irradiation device and the irradiation device is adapted to introduce the radiation into the container from below.

16. The apparatus of claim 15, wherein the coupling rod is guided for axial movement in a longitudinal direction in a cover which is impermeable to radiation from the irradiation device and detachably connected to the container.

* * * * *